(12) United States Patent
Albertson et al.

(10) Patent No.: US 7,801,332 B2
(45) Date of Patent: Sep. 21, 2010

(54) CONTROLLING A SYSTEM BASED ON USER BEHAVIORAL SIGNALS DETECTED FROM A 3D CAPTURED IMAGE STREAM

(75) Inventors: Jacob C. Albertson, Newton, MA (US); Kenneth C. Arnold, Ellicott City, MD (US); Steven D. Goldman, Chesterfield, MO (US); Michael A. Paolini, Austin, TX (US); Anthony J. Sessa, Quogue, NY (US)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 11/622,693

(22) Filed: Jan. 12, 2007

(65) Prior Publication Data
US 2008/0170749 A1 Jul. 17, 2008

(51) Int. Cl.
*G06K 9/00* (2006.01)
(52) U.S. Cl. .................................. 382/107; 382/154
(58) Field of Classification Search ............. None
See application file for complete search history.

(56) References Cited

U.S. PATENT DOCUMENTS

| | | | |
|---|---|---|---|
| 5,103,305 A | 4/1992 | Watanabe | |
| 5,109,425 A | 4/1992 | Lawton | |
| 5,454,043 A | 9/1995 | Freeman | |
| 5,502,803 A | 3/1996 | Yoshida et al. | |
| 5,581,276 A | 12/1996 | Cipolla et al. | |
| 5,691,693 A | 11/1997 | Kithil | |
| 5,714,698 A | 2/1998 | Tokioka et al. | |

(Continued)

FOREIGN PATENT DOCUMENTS

CN 1655197 A 8/2005

(Continued)

OTHER PUBLICATIONS

Alan Yuille, "Computer Vision Systems for the Blind and Visually Disabled", UCLA Dept. Statistics and Psychology, 4 pages, [online], [print accessed on Aug. 18, 2006]. Retrieved from the internet < www.stat.ucla.edu/~yuille/courses/FIAT_Stat19/fiat3.ppt>.

(Continued)

*Primary Examiner*—Charles Kim
(74) *Attorney, Agent, or Firm*—David A. Mims, Jr.; Amy J. Pattillo

(57) ABSTRACT

A computer-implemented method, system, and program includes a behavior processing system for capturing a three-dimensional movement of a user within a particular environment, wherein the three-dimensional movement is determined by using at least one image capture device aimed at the user. The behavior processing system identifies a three-dimensional object properties stream using the captured movement. The behavior processing system identifies a particular defined behavior of the user representing a particular behavioral signal from the three-dimensional object properties stream by comparing the identified three-dimensional object properties stream with multiple behavior definitions each representing a separate behavioral signal for directing control of at least one machine. In response to identifying the particular defined behavior, a machine control system generates a control signal triggered by the particular behavioral signal for directing control of the at least one machine.

19 Claims, 8 Drawing Sheets

U.S. PATENT DOCUMENTS

| | | | |
|---|---|---|---|
| 5,880,731 A | 3/1999 | Liles et al. | |
| 5,930,378 A | 7/1999 | Kubota et al. | |
| 6,002,808 A | 12/1999 | Freeman | |
| 6,049,747 A | 4/2000 | Nakajima et al. | |
| 6,072,494 A | 6/2000 | Nguyen | |
| 6,115,053 A | 9/2000 | Perlin | |
| 6,154,558 A | 11/2000 | Hsieh | |
| 6,181,343 B1 | 1/2001 | Lyons | |
| 6,215,890 B1 | 4/2001 | Matsuo et al. | |
| 6,295,367 B1 | 9/2001 | Crabtree et al. | |
| 6,301,370 B1 | 10/2001 | Steffens et al. | |
| 6,421,453 B1 | 7/2002 | Kanevsky | |
| 6,577,937 B1 | 6/2003 | Shuman | |
| 6,674,877 B1 | 1/2004 | Jojic et al. | |
| 6,766,036 B1 | 7/2004 | Pryor | |
| 6,784,901 B1 | 8/2004 | Harvey et al. | |
| 6,788,809 B1 | 9/2004 | Grzeszczuk et al. | |
| 6,859,144 B2 | 2/2005 | Newman et al. | |
| 7,039,676 B1 | 5/2006 | Day et al. | |
| 7,058,204 B2 | 6/2006 | MacDougall et al. | |
| 7,068,843 B2 | 6/2006 | Chang et al. | |
| 7,224,830 B2 | 5/2007 | Nefian et al. | |
| 7,274,800 B2 | 9/2007 | Nefian et al. | |
| 2002/0004629 A1 | 1/2002 | Natori | |
| 2002/0118880 A1 | 8/2002 | Liu | |
| 2002/0152010 A1 | 10/2002 | Colmenarez | |
| 2003/0058111 A1* | 3/2003 | Lee et al. | 340/573.1 |
| 2003/0076300 A1 | 4/2003 | Lauper | |
| 2003/0113018 A1 | 6/2003 | Nefian | |
| 2003/0142068 A1 | 7/2003 | DeLuca | |
| 2003/0156756 A1 | 8/2003 | Gokturk | |
| 2003/0227453 A1 | 12/2003 | Beier et al. | |
| 2004/0032970 A1 | 2/2004 | Kiraly | |
| 2004/0161132 A1 | 8/2004 | Cohen et al. | |
| 2004/0228503 A1 | 11/2004 | Cutler | |
| 2005/0030184 A1 | 2/2005 | Victor | |
| 2005/0069852 A1 | 3/2005 | Janakiraman et al. | |
| 2005/0166163 A1 | 7/2005 | Chang | |
| 2005/0206610 A1 | 9/2005 | Cordeli | |
| 2005/0210419 A1 | 9/2005 | Kela et al. | |
| 2006/0013440 A1 | 1/2006 | Cohen | |
| 2006/0097857 A1 | 5/2006 | Osaka et al. | |
| 2006/0181518 A1 | 8/2006 | Shen et al. | |
| 2006/0181519 A1 | 8/2006 | Vernier et al. | |
| 2006/0210112 A1 | 9/2006 | Cohen et al. | |
| 2007/0063855 A1 | 3/2007 | Maass | |
| 2008/0040692 A1 | 2/2008 | Sunday et al. | |
| 2008/0068187 A1 | 3/2008 | Bonefas et al. | |
| 2009/0274339 A9* | 11/2009 | Cohen et al. | 382/103 |

FOREIGN PATENT DOCUMENTS

| | | |
|---|---|---|
| EP | 0905644 | 3/1999 |
| EP | 0991011 A | 4/2000 |
| EP | 1723901 A | 11/2006 |
| EP | 1723901 A1 | 11/2006 |
| FR | 2784887 A | 4/2000 |
| WO | 0002187 A | 1/2000 |
| WO | 2004108466 A | 12/2004 |

OTHER PUBLICATIONS

"What is Photosynth", Microsoft Live Labs, copyright Microsoft Corporation 2006, 1 page, [online], [print accessed on Aug. 18, 2006]. Retrieved from the internet <http://labs.live.com/photosynth/whatis/>.

"What is Synthetic Aperture Radar", 3 pages, copyright 2005, Sandia Corporation, [online], [print accessed on Aug. 18, 2006]. Retrieved from the Internet <http://www.sandia.gov/RADAR/whatis.html>.

"Accelerometer", 3 pages, copyright Wikipedia, [online], [print accessed on Oct. 31, 2006], [last modified on Oct. 24, 2006]. Retrieved from the internet <http://en.wikipedia.org/wiki/Accelerometer>.

Eric Lipton, "Faces, Too are Searched as U.S. Airports Try to Spot Terrorists", 1 page, The New York Times, Aug. 17, 2006.

"Method for Access Control Via Gesural Verification", IBM Technical Disclosure Bulletin, IBM Corp, New York, US, vol. 36, No. 9B, Sep. 1, 1993, pp. 487-488, 2 pages.

Black, MJ et al, "Recognizing Temporal Trajectories Using the Condensation Algorithm", Automatic Face and Gesture Recognition, 1998, Proceedings from the Third IEEE International Conference on Nara, Japan, Apr. 1998, Los Alamitos CA, USA, IEEE Comuting Society, pp. 16-21, 6 pages.

Jacob C Albertson et al, "Warning A User About Adverse Behaviors of Others Within an Environment Based on a 3D Captured Image Stream", U.S. Appl. No. 11/622,676, filed Jan. 12, 2007.

Jacob C Albertson et al, "Adjusting A Consumer Experience Based on a 3D Captured Image Stream of a Consumer Response", U.S. Appl. No. 11/622,679, filed Jan. 12, 2007.

Jacob C Albertson et al, "Warning a Vehicle Operator of Unsafe Operation Behavior Based on a 3D Captured Image Stream", U.S. Appl. No. 11/622,684, filed Jan. 12, 2007.

Jacob C Albertson et al, "Tracking A Range of Body Movement Based on 3D Captured Image Streams of a User", U.S. Appl. No. 11/622,685, filed Jan. 12, 2007.

Jacob C Albertson et al, "Controlling Resource Access Based on User Gesturing in a 3D Captured Image Stream of the User", U.S. Appl. No. 11/622,687, filed Jan. 12, 2007.

Jacob C Albertson et al, "Controlling a Document Based on User Behavioral Signals Detected from a 3D Captured Image Stream", U.S. Appl. No. 11/622,690, filed Jan. 12, 2007.

Jacob C Albertson et al, "Assisting a Vision-Impaired User with Navigation Based on a 3D Captured Image Stream", U.S. Appl. No. 11/622,696, filed Jan. 12, 2007.

Jacob C Albertson et al, "Informing a User of Gestures Made by Others Out of the User's Line of Sight", U.S. Appl. No. 11/470,421, filed Sep. 6, 2006.

USPTO Office Action, Dated Jun. 25, 2009, in Re Albertson (U.S. Appl. No. 11/470,421, filed Sep. 6, 2006), pp. 1-20.

USPTO Notice of Allowance, Dated Dec. 14, 2009, in Re Albertson (U.S. Appl. No. 11/470,421, filed Sep. 6, 2006), pp. 1-13.

USPTO Office Action, Dated Jan. 15, 2010, in Re Albertson (U.S. Appl. No. 11/622,684, filed Jan. 12, 2007), pp. 1-24.

USPTO Office Action, Dated Mar. 22, 2010, in Re Albertson (U.S. Appl. No. 11/622,690, filed Jan. 12, 2007), 30 Pages.

USPTO Office Action, Dated Mar. 30, 2010, in Re Albertson (U.S. Appl. No. 11/622,685, filed Jan. 12, 2007, 28 Pages.

USPTO Notice of Allowance, Dated May 3, 2010, In Re Albertson (U.S. Appl. No. 11/622,684, filed Jan. 12, 2007), pp. 1-37.

\* cited by examiner

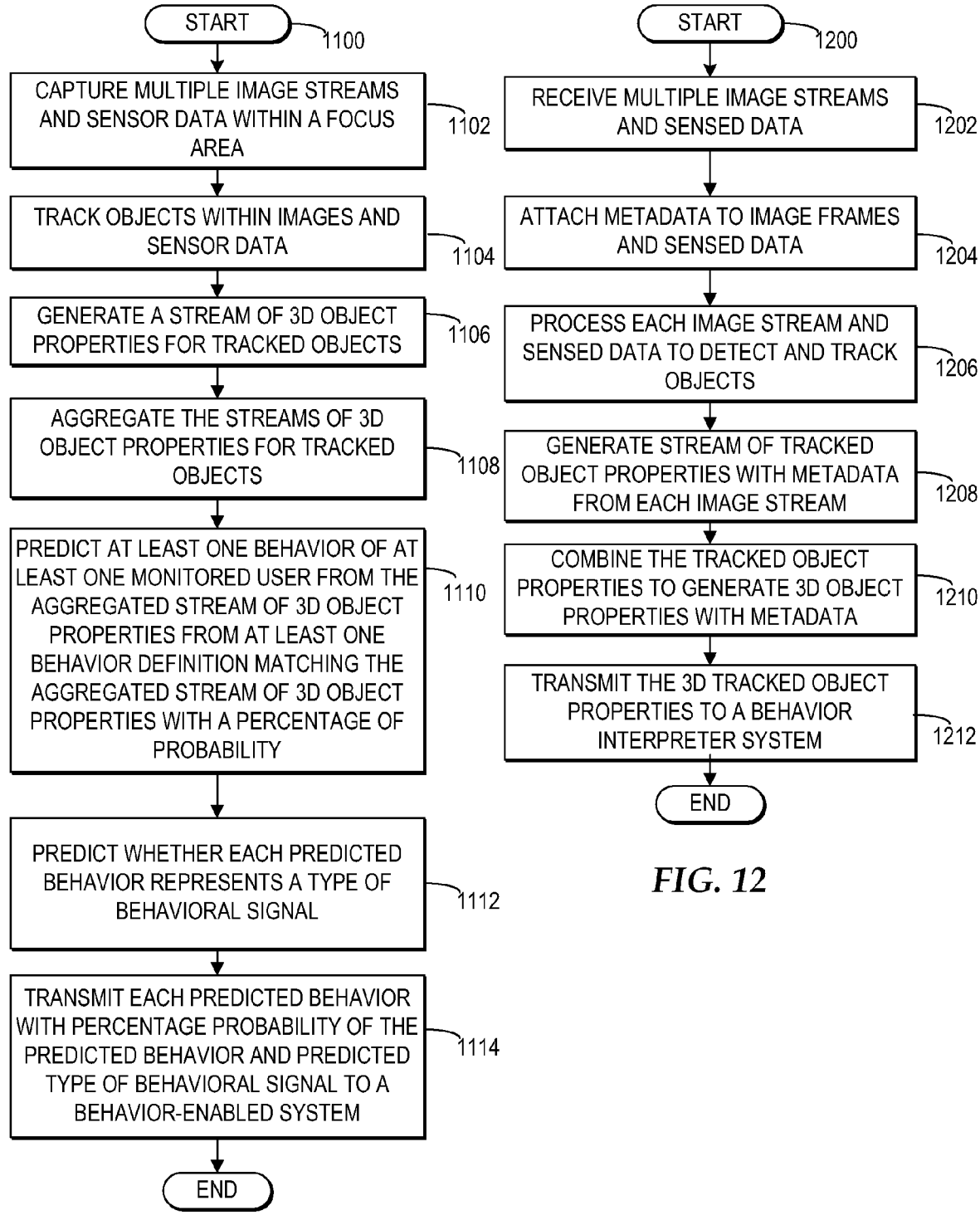

CONTROLLING A SYSTEM BASED ON USER BEHAVIORAL SIGNALS DETECTED FROM A 3D CAPTURED IMAGE STREAM

TECHNICAL FIELD

The present invention relates in general to improved automated machine control. In particular, the present invention relates to detecting, from a three-dimensional image stream captured by one or more image capture devices, behaviors of a user indicative of behavioral signals for directing control of a computing system or other machine.

DESCRIPTION OF THE RELATED ART

Many people work or travel in environments that include moving or operable machinery. For example, a traffic patrolman works in a street environment to direct drivers of vehicles through an intersection. A crane operator works in a construction environment to direct a crane in moving an object or piece of equipment. An assembly line worker works alongside an automated machine.

In these environments in which people work or travel alongside moving or operable machinery, while many machines include more and more automated features, there are still many machines which require human input to trigger a function of the machine. For example, a traffic patrolman still relies on a driver to see the patrolman and respond to the patrolman's signals and also ignore a traffic signal if present. A crane operator may have blind spots and still relies on another person to visually signal to the crane operator to stop the crane or lower or raise the boom. An assembly line worker still relies on another person to detect the worker experiencing unsafe conditions and to trigger a shutoff option to shut off a machine.

In each of these scenarios, a first person communicates through behaviors and gestures in an attempt to direct a second person to control a machine. The problem is that the second person may not always notice or properly interpret the non-verbal behaviors, including gestures, of a first person, and an emergency situation may develop as a result of a second person improperly operating a machine or omitting to stop operation of a machine. In addition, in each of these scenarios, a first person may also attempt to communicate through verbal noises and words in an attempt to get the attention of a second person, however, verbal communications could be distorted or muffled in an emergency situation occurring in a noisy environment.

Therefore, in view of the foregoing, there is a need for a method, system, and program for monitoring an environment in which a person may communicate through behaviors including gesturing, recognizing the behaviors, determining which behaviors represent behavioral signals for directing the control of a machine, and controlling an output signal triggered by the behavior signal to a machine.

SUMMARY OF THE INVENTION

Therefore, the present invention provides improved automation of machines. In particular, the present invention provides for detecting, from a three-dimensional image stream captured by one or more image capture devices, behaviors of a user indicative of behavioral signals for directing control of a computing system or other machine.

In one embodiment, a computer-implemented method, system, and program product comprises a behavior processing system for capturing a three-dimensional movement of a user within a particular environment, wherein the three-dimensional movement is determined by using at least one image capture device aimed at the user. The behavior processing system identifies a three-dimensional object properties stream using the captured movement. The behavior processing system identifies a particular defined behavior of the user representing a particular behavioral signal from the three-dimensional object properties stream by comparing the identified three-dimensional object properties stream with multiple behavior definitions each representing a separate behavioral signal for directing control of at least one machine. In response to identifying the particular defined behavior, a machine control system generates a control signal triggered by the particular behavioral signal for directing control of the at least one machine.

In capturing the three-dimensional movement of the user the behavior processing system captures the three-dimensional movement using a stereoscopic image device to identify and track three-dimensional movement of the user. Additionally, in another embodiment, the behavior processing system captures the three-dimensional movement of the user by capturing at least one image frame of a user at a first point in time and comparing the first frames with additional frames captured at a second point in time.

In identifying the particular defined behavior representing the particular behavioral signal, the behavior processing system identifies at least one body movement at a fine granularity from among an eye movement, facial expression, muscle contraction or change in skin surface characteristics of the user. In addition, in identifying the particular defined behavior representing the particular behavioral signal, the behavior processing system identifies a behavioral signal indicating the user is experiencing a medical emergency and trigger a control signal for directing a notification via an automated medical dispatch system. Further, in identifying the particular defined behavior representing the particular behavioral signal, the behavior processing system identifies a user signaling to control a specific function of a machine.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 11 is a high level logic flowchart illustrating a process and program for a behavior processing system to predict behavior types with a percentage probability;

FIG. 12 is a high level logic flowchart depicting a process and program for behavior detection by tracking objects within image streams and other sensed data and generating 3D object properties for the tracked objects representative of behaviors;

DETAILED DESCRIPTION OF THE PREFERRED EMBODIMENT

Figure 1:
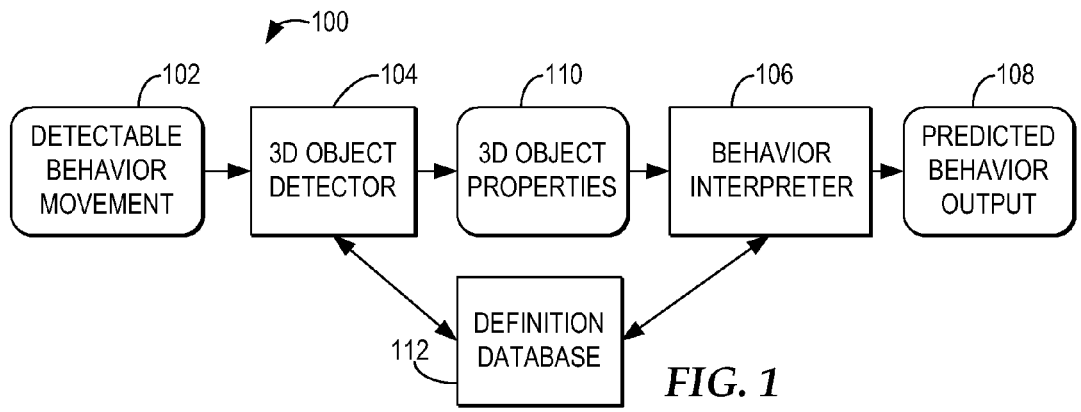
FIG. 1 is a block diagram illustrating a flow of information in a behavior processing method, system, and program product.

With reference now to FIG. 1, a block diagram illustrates a flow of information in a behavior processing method, system, and program product. It will be understood that FIG. 1 provides one embodiment of information flow for capturing image streams within an environment including machine control and processing those image streams to predict behaviors of users within the environment and to predict which behaviors represent behavioral signals for directing the control of a machine within a particular environment, however, other information flows may be implemented to process captured data and predict behaviors and whether the behaviors represent behavioral signals for directing the control of a machine.

It is important to note that as used throughout, the term "behavior" may include user actions typically labeled as behavior or body language, such as gesturing and facial expressions, and may also include any detectable body movements, detectable body posture, detectable eye movements, changes in skin surface characteristics such as color, temperature, tone, and level of perspiration, changes in muscle contraction, and other types of non-verbal communication. The term "machine" as used throughout, may include, but is not limited to, one or more of a computer system, a computer network system, a computer automated system, a mechanized system, and an engine controlled system. Predicting that a behavior is representative of a behavioral signal for directing the control of a machine indicates that the behavior, whether voluntary or involuntary, is classified as a type of behavior responsive to which a control signal for one or more machines should be generated within a particular environment. A "control signal" may perform multiple types of machine control, dependent on the type of machine. For example, a control signal sent to an assembly line controller may control the speed of the assembly line. In another example, a control signal sent to a communication controller may control the output of signals to other persons or an interface accessible to other persons.

In the example, a behavior processing system 100 includes a three-dimensional (3D) object detector 104. 3D object detector 104 represents multiple systems for capturing images and other data about moving and stationary objects, streamlining the captured data, tracking particular objects within the captured movement, streaming the properties of the particular objects, and combining the streamed properties into a three-dimensional representation of the 3D characteristics of the captured objects, as illustrated by 3D object properties 110. 3D object properties 110 may include, but are not limited to, positions, color, size, and orientation, representative of movement by users within an environment, objects within an environment, and the background identifying attributes of an environment, for example.

In the example, 3D object detector 104 captures images within a focus area, represented as detectable behavior movement 102. In addition, 3D object detector 104 may detect other types of data within a focus area. In particular, 3D object detector 104 detects detectable behavior movement 102 through multiple types of image and data detection including, but not limited to, capturing video images, detecting body part movement, detecting skin texture, detecting eye movement, detecting skin surface characteristics, and capturing thermal images. For supporting multiple types of image and data detection, 3D object detector 104 may include multiple types of image capture devices, including one or more video cameras arranged for stereoscope video image capture, and other types of sensors for capturing at least one other characteristic of one or more objects, such as thermal body imaging sensors, skin texture sensors, laser sensing devices, sound navigation and ranging (SONAR) devices, or synthetic laser or sonar systems. In particular, a sensor may be implemented using a separate sensor unit or may be implemented through a logic unit that operates on a captured image stream. For example, a logic unit may process the captured image stream to detect facial skin textures distinguishable from non-skin textures, such as a smooth wall or textured foliage, within a focus area.

Portions of detectable behavior movement 102 may include images and other data representative of actual behaviors and other portions of detectable behavior movement 102 may include images and data not representative of behaviors. In addition, detectable behavior movement 102 may include one or more of moving and stationary persons and moving and stationary machines. Further, some behaviors within detectable behavior movement 102 may represent behavioral signals for directing the control of a machine.

3D object detector 104 translates detectable behavior movement 102 into a stream of 3D properties of detected objects and passes the stream of 3D object properties 110 to behavior interpreter 106. Behavior interpreter 106 maps the streamed 3D object properties 110 into one or more behaviors for each detected user and estimates, for each predicted behavior of a detected user, the probability that the actual behavior in detectable behavior movement 102 is correctly predicted by behavior interpreter 106. In addition, behavior interpreter 106 predicts whether a particular predicted behavior represents a behavioral signal for directing the control of a machine.

Behavior interpreter 106 outputs each predicted behavior, percentage probability, and whether the predicted behavior represents a behavioral signal for directing the control of a machine as predicted behavior output 108. Behavior interpreter 106 may pass predicted behavior output 108 to one or more behavior-enabled applications at one or more systems.

In particular, in processing detectable behavior movement 102 and generating predicted behavior output 108, 3D object detector 104 and behavior interpreter 106 may access a definition database 112 of previously accumulated and stored behavior definitions to better track and detect, within 3D object properties 110, those monitored objects representative of behaviors, to better recognize people separate from other objects within detectable behavior movement 102, and to better track, recognize, and predict behaviors representative of behavioral signals by authorized persons for directing the control of a machine from 3D object properties 110.

In addition, in processing behavior movement 102 and generating predicted behavior output 108, 3D object detector 104 and behavior interpreter 106 may access definition database 112 with behavior definitions specified for the type of behavior-enabled application to which predicted behavior output 108 will be output. For example, in the present embodiment, predicted behavior output 108 may be output to a machine control system, for the machine control system to convert into control signals for controlling one or more machines, such that behavior interpreter 106 attempts to predict a type of behavior from a detected object movement that more closely resembles a type of behavior that represents a behavioral signal for directing the control of a machine.

In one example, ground crew use specific signals when directing pilots to park a plane at a terminal space. Within the environment of a terminal space, 3D object detector 104 and behavior interpreter 106 access behavior definitions for the types of behaviors representative of specific signals typically used by ground crew. Behavior interpreter 106 generates predicted behavior output 108 identifying those behaviors representing behavioral signals by ground crew for directing a pilot to park a plane. In one example, based on predicted behavior output 108, control signals may be generated by a machine control system for controlling an auto-pilot function for controlling the actual movement of the plan or for controlling an auto-navigation system for generating audio, textual or graphical instructions output to a pilot based on the behaviors of the ground crew.

Further, behavior interpreter 106 generates predicted behavior output 108 identifying behaviors and identifying the time range over which a behavior occurs or the speed or intensity at which a behavior occurs. In one example, the speed or intensity with which the ground crew waves to direct a plane can be translated into a correlating speed of travel for the plane in a control signal generated by the machine control system.

Further, in processing behavior movement 102 and generating predicted behavior output 108, 3D object detector 104 and behavior interpreter 106 attempt to identify objects representative of user behaviors and predict the type of behavior in view of the overall interaction in which the behavior is made. Thus, 3D object detector 104 and behavior interpreter 106 attempt to determine not just a behavior, but a level of emphasis included in a behavior that would effect the meaning of the behavior, a background of a detected user making a behavior that would effect the meaning of the behavior, the environment in which the detected user makes the behavior that would effect the meaning of the behavior, combinations of behaviors made together that effect the meaning of each behavior and other detectable factors that effect the meaning of a behavior. In addition, 3D object detector 104 and behavior interpreter 106 determine whether a particular person making a behavior is a person whose behavior should trigger machine control. Thus, definition database 112 includes behaviors definitions corresponding different types of people, environments, and other factors that may affect the meaning of a behavior. In addition, definition database 112 includes behavior definitions adjusted according to a corresponding facial expression or other corresponding behavior. Further, definition database 112 may be trained to more accurately identify objects representing particular people, animals, places, or things.

In addition, in processing behavior movement 102, multiple separate systems of image capture devices and other sensors may each capture image and data about separate or overlapping focus areas from different angles. The separate systems of image capture devices and other sensors may be communicatively connected via a wireless or wired connection and may share captured images and data with one another, between 3D behavior detectors or between behavior interpreters, such that with the combination of data, behavior interpreter 106 may interpreter behaviors with greater accuracy.

Figure 2:
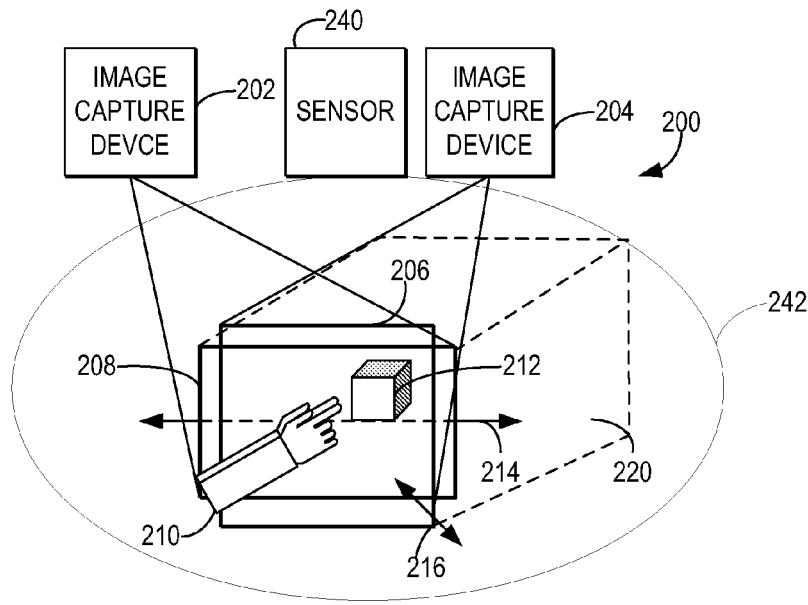
FIG. 2 is an illustrative block diagram depicting an example of an environment in which a 3D object detector captures and generates the 3D object properties representative of captured behavior movement.
Figure 8:
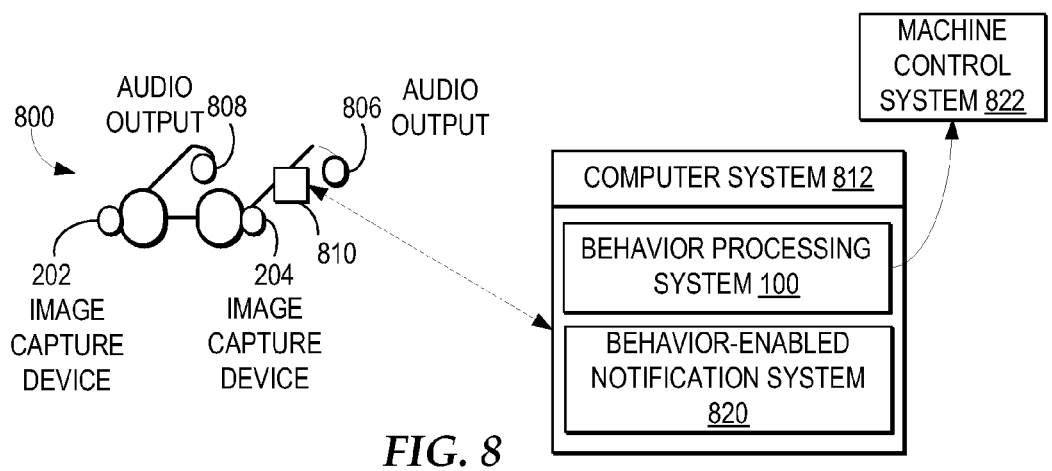
FIG. 8 is a block diagram depicting one example of a portable image capture system communicatively connected to a behavior processing system for predicting behaviors representing behavioral signals for directing the control of a machine.
Figure 9:
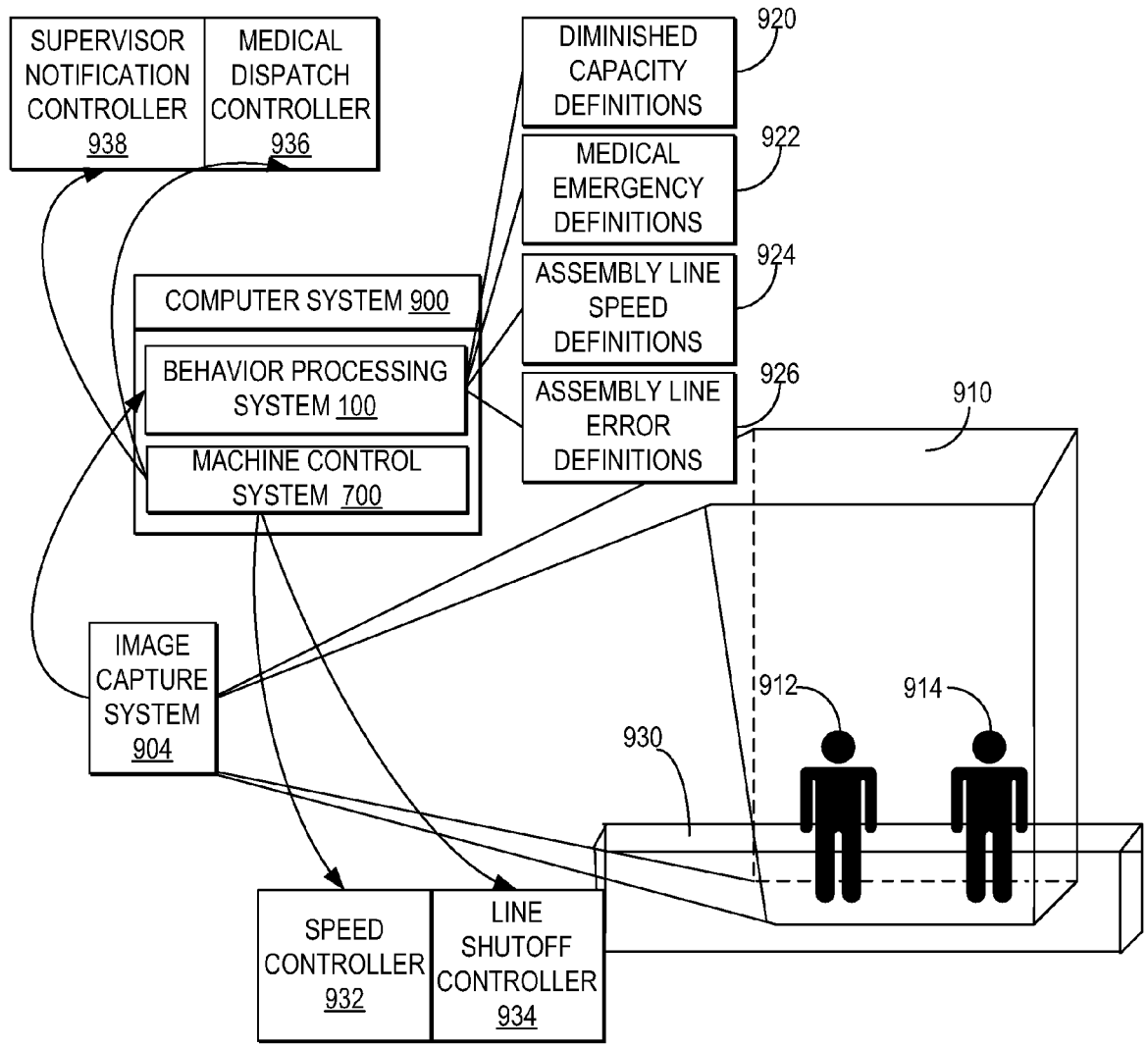
FIG. 9 is an illustrative diagram illustrating one example of a behavior processing system and behavior-enabled machine control system within a manufacturing environment.
Figure 10:
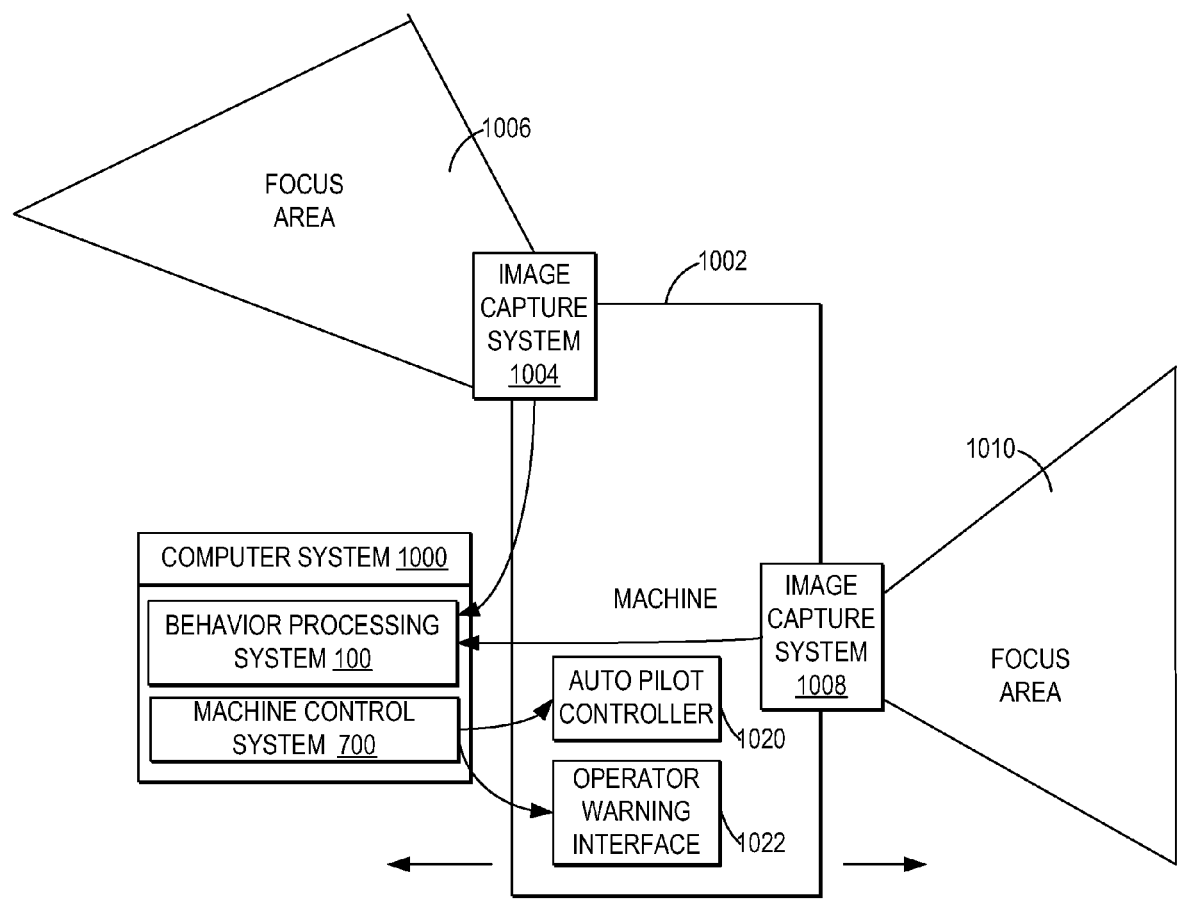
FIG. 10 is an illustrative diagram depicting one example of a behavior processing system and behavior-enabled machine control system within a machine control environment.

Referring now to FIG. 2, an illustrative diagram depicts an example of an environment in which a 3D object detector captures and generates the 3D object properties representative of captured behavior movement. It will be understood that detectable movement environment 200 is one example of an environment in which 3D object detector 104 detects images and data representative of detectable behavior movement 102, as described with reference to behavior processing system 100 in FIG. 1. Other environments may be implemented in which behavior movement is detected and processed. For example, FIGS. 8, 9 and 10 illustrate environments in which behavior movement is detected and processed.

In the example, detectable movement environment 200 includes a stereoscopic image device comprising an image capture device 202 and an image capture device 204, each positioned to detect movement of one or more objects, including people, within a combined 3D focus area 220. In the depicted embodiment, image capture device 202 and image capture device 204 may each be positioned on one stationary axis or separate stationary axis, such that the area represented by 3D focus area 220 remains constantly focused upon. In addition, in the depicted embodiment, image capture device 202 and image capture device 204 and any other sensors may be positioned in parallel, at tangents, or at any other angles to control the span of and capture images within 3D focus area 220.

In another embodiment, image capture device 202 and image capture device 204 may each be positioned on a position adjustable axis or the actual focus point of image capture device 202 and image capture device 204 may be adjustable, such that the area represented by 3D focus area 220 may be repositioned. In one example, each of image capture device 202 and image capture device 204 may be coupled with one or more thermal imaging devices that detect thermal imaging based movement within a broad area and directs the repositioning of the focus area of each of image capture device 202 and image capture device 204 to track the thermal movement within the focus area of each camera.

Further, in the present embodiment, image capture device 202 and image capture device 204 may be affixed to an apparatus that is carried by or worn by a person or a machine. For example, image capture device 202 and image capture device 204 may be affixed to a pair of glasses or other headwear for a person, such that 3D focus area 220 changes as the person moves. In another example, image capture device 202 and image capture device 204 may be affixed to a moving machine, such as a vehicle, such that 3D focus area 220 changes as the vehicle moves.

Although not depicted, in another embodiment, only a single video camera, such as image capture device 202, may be implemented as a stereoscopic image device. The single video camera is placed on a track or other adjustable axis and a controller adjusts the position of the single video camera along the track, wherein the single video camera then captures a stream of video images within a focus area at different positioned points along the track and 3D behavior detector 104 combines the stream of images into a 3D object property stream of the properties of detectable objects. In one example, the 3D object property stream can be generated from comparing the changes in luminance and shadowing across the frames as the camera changes in position. Alternatively, a stereoscopic image device may be implemented using a single fixed camera coupled with a sensor that detects depth. In addition, alternatively, a single camera enabled to process images and detect depth from a fixed position may function as a stereoscopic image device. For example, the single camera may process images and detect depth from detecting the movement of a light source and comparing changes in luminance and shadowing across the captured image frames. In particular, the single camera system may first map a model of a person's face, focusing on the eyes, mouth, and nose and then detect changes in luminance and shadowing across image frames to detect depth characteristics of the face. In other examples, a system may process a captured stream of video images to extract depth from other characteristics of the stream of images.

For purposes of example, 3D focus area 220 includes a first capture plane 206, captured by image capture device 202 and a second capture plane 208, captured by image capture device 204. First capture plane 206 detects movement within the plane illustrated by reference numeral 214 and second capture plane 208 detects movement within the plane illustrated by reference numeral 216. Thus, for example, image capture device 202 detects movement of an object side to side or up and down and image capture device 204 detects movement of an object forward and backward within 3D focus area 220. It is important to note that when the movement of an object is tracked at a fine granularity, even small adjustments in the body movement such as a raised eyebrow, a constricted muscle, or a finger bending, of a person are tracked and can then be interpreted as behavior representing a behavioral signal for directing the control of a machine.

In the example, within 3D focus area 220, a hand 210 represents a moving object and a box 212 represents a stationary object. In the example, hand 210 is the portion of a person's hand within 3D focus area 220. A monitored person may make any number of movements, some representative of behavioral signals for directing control of a machine, by moving hand 210.

As a person moves hand 210 within 3D focus area 220, each of image capture device 202 and image capture device 204 capture a video stream of the movement of hand 210 within capture plane 206 and capture plane 208. From the video streams, 3D object detector 104 detects hand 210 as a moving object within 3D focus area 220 and generates a 3D property stream, representative of 3D object properties 110, of hand 210 over a period of time.

In addition, a person may move hand 210 in relation to box 212 or another object. For example, a person may point or make another type of behavior directed to box 212. As the person moves hand 210 within 3D focus area 220, the video streams captured by image capture device 202 and image capture device 204 include the movement of hand 210 and box 212. From the video streams, 3D object detector 104 detects hand 210 as a moving object and box 212 as a stationary object within 3D focus area 220 and generates 3D object property streams indicating the 3D properties of box 212 and the 3D properties of hand 210 in relation to box 212 over a period of time.

It is important to note that by capturing different planes of movement within 3D focus area 220 using multiple cameras, more points of movement are captured than would occur with a typical stationary single camera. By capturing more points of movement from more than one angle, 3D object detector 104 can more accurately detect and define a 3D representation of stationary objects and moving objects, including behaviors, within 3D focus area 220. In addition, the more accurately that 3D object detector 104 defines a 3D representation of a moving object, the more accurately behavior interpreter 106 can predict a behavior from the 3D model. For example, a behavior could consist of a user making a motion directly towards or away from one of video camera 202 and video camera 204 which would not be able to be captured in a two dimensional frame; 3D behavior detector 104 detects and defines a 3D representation of the behavior as a moving object and behavior interpreter 106 predicts the behavior made by the movement towards or away from a video camera from the 3D model of the movement. Further, by capturing more points in different planes of movement within 3D focus area 220, the processing load required to generate 3D object properties 110 is reduced in comparison to the processing load needed to generate 3D object properties 110 from points gathered from only a single 2D plane of movement.

In addition, it is important to note that while FIG. 2 illustrates a gesturing hand 210 and a stationary box 212, in alternate embodiments, 3D focus area 220 may include multiple separate monitored people, machines, and other elements, such that image capture device 202 and image capture device 204 capture images of the behavior of multiple people and images of behavior of multiple people in relation to one or more machines, and 3D object detector 104 detects each behavior by each person as a separate object. In particular, 3D object detector 104 may detect, from the captured video images from image capture device 202 and image capture device 204, behaviors with more motion, such as behaviors made with hands, and behaviors made with less motion, such as facial expressions, to accurately generate 3D object properties of a person's non-verbal communication.

In the example, in addition to capturing images within focus area 220, within detectable movement environment 200, other sensors may detect information relevant to an environment, but outside of focus area 220. For example, sensor 240 may detect information within a sensor area 242. Sensor area 242 may overlap, be incorporated within, incorporate, or be separate from focus area 220. 3D object detector 104 combines the sensed information with captured images to more accurately generate 3D object properties 110 and to provide additional information about an environment to a machine control system.

In one example, sensor 240 may detect information broadcast from RFID chips placed on objects within sensor area 242, where the RFID of an object broadcasts the object type, the object location, and any warning conditions associated with the object. By combining sensed information about the location of a particular object with captured images from which the image is identified, object detector 104 may more accurately generate 3D object properties 110 and behavior interpreter 106 may more accurately predict the types of 3D objects and the behaviors representing behavioral signals for directing the control of a machine detected within 3D object properties 110. In addition, by sensor 240 accessing location information, behavior interpreter 106 may include location identifying data with a behavior record that enables a behavior-enabled system, such as a machine control system, to map behaviors to particular monitored people and to particular locations within particular monitored environments.

In another example, sensor 240 may track the relative location of a tracked object within sensor area 242. Although not depicted, sensor area 242 may track a moving object, including a person or machine, from a first focus area 220 to a second focus area within sensor area 242. By tracking movement across multiple focus areas, sensor 240 provides additional tracking information of a location of a monitored person or machine so that data gathered in different focus areas can be shared when generating 3D object properties 110. Additionally, sensor area 242 may represent a particular security area, where if motion is detected within sensor area 242, sensor 240 triggers adjustment of focus area 220 to capture motion causing entity. Moreover, sensor 240 may detect a changing GPS location of sensor area 242 such that maps or other information associated with a particular GPS location can be accessed and used in generating 3D object properties 110, determining whether behavior represents behavioral signals for directing the control of a machine, and in triggering machine control including an identification of the GPS mapped area.

In yet another example, sensor 240 may detect additional information about the depth, surface area, color temperature or other characteristic of an object to more accurately predict whether the object is representative of a particular behavior and whether that represents a behavioral signal for directing the control of a machine. In particular, by detecting additional information about the depth, surface area, or other characteristic of an object, data collected by sensor 240 is combined with images captured by image capture device 202 and image capture device 204 to generate additional detail and granularity in a 3D image of an object.

Figure 3:
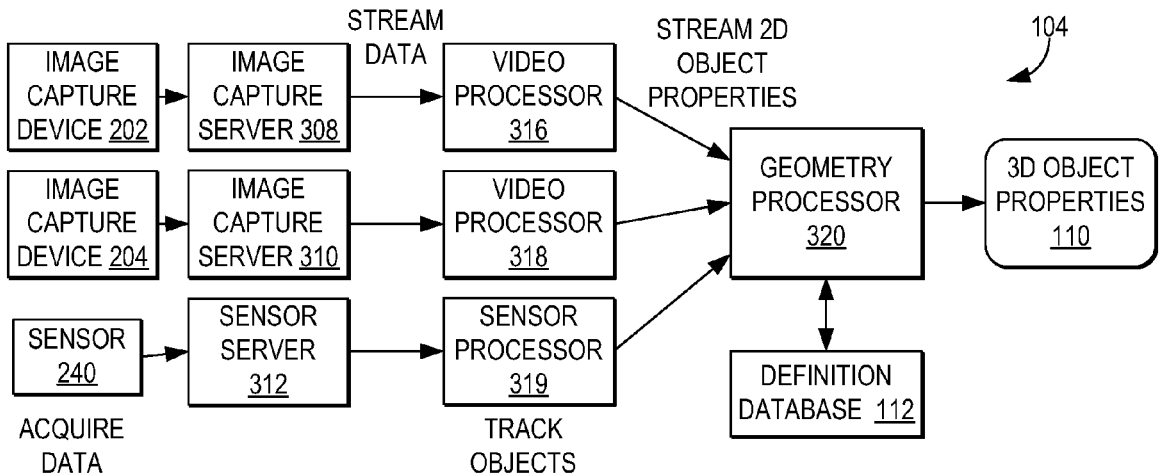
FIG. 3 is a block diagram illustrating one embodiment of a 3D object detector system for generating 3D object properties for enabling a behavior interpreter to interpret, from 3D object properties, behaviors of monitored people and whether these behaviors represent behavioral signals for directing the control of a machine.

With reference now to FIG. 3, a block diagram illustrates one embodiment of a 3D object detector system for generating 3D object properties for enabling a behavior interpreter to interpret, from 3D object properties, behaviors of monitored people and whether these behaviors represent behavioral signals for directing the control of a machine. It is important to note that the multiple components depicted within 3D object detector 104 may be incorporated within a single system or distributed via a network, other communication medium, or other transport medium across multiple systems. In addition, it is important to note that additional or alternate components from those illustrated may be implemented in 3D object detector 104 for capturing images and data and generating a stream of 3D object positions 110.

Initially, multiple image capture devices, such as image capture device 202, image capture device 204 and sensor 240, represent a stereoscopic image device for acquiring the data representative of detectable movement 102 within a 3D focus area and sensor area, such as 3D focus area 220 and sensor area 242. As previously described, image capture device 202 and image capture device 204 may represent video cameras for capturing video images. In addition, image capture device 202 and image capture device 204 may represent a camera or other still image capture device. In addition, image capture device 202 and image capture device 204 may represent other types of devices capable of capturing data representative of detectable behavior movement 102. Image capture device 202 and image capture device 204 may be implemented using the same type of image capture system or different types of image capture systems. In addition, the scope, size, and location of the capture area and plane captured by each of image capture device 202 and image capture device 204 may vary.

Sensor 240 may represent one or more different types of sensors as described with reference to FIG. 2. Sensor 240 may gather independent data about an object or may process the images captured by image capture device 202 and image capture device 204.

Each of image capture device 202, image capture device 204, and sensor 240 transmit captured images and data to one or more computing systems enabled to initially receive and buffer the captured images and data. In the example, image capture device 202 transmits captured images to image capture server 308, image capture device 204 transmits captured images to image capture server 310, and sensor 240 transmits captured data to sensor server 312. Image capture server 308, image capture server 310, and sensor server 312 may be implemented within one or more server systems.

Each of image capture server 308, image capture server 310, and sensor server 312 streams the buffered images and data from image capture device 202, image capture device 204, and sensor device 240 to one or more processors. In the example, image capture server 308 streams images to a video processor 316, image capture server 310 streams images to a video processor 318, and sensor server 312 streams the sensed data to sensor processor 319. It is important to note that video processor 316, video processor 318, and sensor processor 319 may be implemented within one or more processors in one or more computer systems.

In one example, image capture server 308 and image capture server 310 each stream images to video processor 316 and video processor 318, respectively, where the images are streamed in frames. Each frame may include, but is not limited to, a camera identifier (ID) of the image capture device, a frame number, a time stamp and a pixel count.

Video processor 316, video processor 318, and sensor processor 319 are programmed to detect and track objects within image frames. In particular, because video processor 316, video processor 318, and sensor processor 319 receive streams of complex data and process the data to identify three-dimensional objects, including objects representing monitored people and machines, and characteristics of the three-dimensional objects, video processor 316, video processor 318, and sensor processor 319 may implement the Cell Broadband Engine (Cell BE) architecture (Cell Broadband Engine is a registered trademark of Sony Computer Entertainment, Inc.). The Cell BE architecture refers to a processor architecture which includes a base processor element, such as a Power Architecture-based control processor (PPE), connected to multiple additional processor elements also referred to as Synergetic Processing Elements (SPEs) and implementing a set of DMA commands for efficient communications between processor elements. In particular, SPEs may be designed to handle certain types of processing tasks more efficiently than others. For example, SPEs may be designed to more efficiently handle processing video streams to identify and map the points of moving objects within a stream of frames. In addition, video processor 316, video processor 318, and sensor processor 319 may implement other types of processor architecture that enables efficient processing of video images to identify, in three-dimensions, moving and stationary objects within video images from which behavior of monitored people, and whether the behavior represents behavioral signals for directing the control of a machine, can be predicted.

In the example, video processor 316, video processor 318, and sensor processor 319 each create and stream the properties, including positions, color, size, shape, and orientation, of the detected objects to a geometry processor 320. In one example, each processed frame streamed to geometry processor 320 may include, but is not limited to, a camera ID, a frame number, a time stamp, and combinations of two or more of X axis coordinates (x_loc), Y axis coordinates (y_loc), and Z axis coordinates (z_loc). It is important to note that x_loc, y_loc, and z_loc may each include multiple sets of points and other data that identify all the properties of an object. If multiple objects are detected and tracked within a single frame, the X axis coordinates and Y axis coordinates for each object may be included in a single streamed object property record or in multiple separate streamed object property records. In addition, a streamed property frame, such as the frame from sensor processor 319 for a SONAR detected position, may include Z axis location coordinates, listed as z_loc, for example.

Geometry processor 320 receives the 2D streamed object properties from video processor 316 and video processor 318 and the other object data from sensor processor 319. Geometry processor 320 matches up the streamed 2D object properties and other data and constructs 3D object properties 110 from the streamed 2D object properties and other data. In particular, geometry processor 320 constructs 3D object properties 110 that include the depth of an object. In one example, each 3D object property record constructed by geometry processor 320 may include a time stamp, an object or user movement label, X axis coordinates (x_loc), Y axis coordinates (y_loc), and Z axis coordinates (z_loc), and additional information collected from sensors. For example, additional information collected from sensors may include a location identifier received from an RFID or GPS detected location coordinates.

At any of video processor 316, video processor 318, sensor processor 319, and geometry processor 320 property records may include at least one identifier to enable persistence in tracking the object. For example, the identifier may include a unique identifier for the object itself and an identifier of a class or type of object, including an object identified as user movement.

In particular, by video processor 316, video processor 318, and sensor processor 319 identifying and classifying object properties, each of the processors may access definition database 112 for accessing previously processed inputs and behavior mappings to more accurately identify and classify 2D object properties to detect and match the streamed 2D object properties to an object. In addition, geometry processor 320 may more accurately construct 3D properties of objects based on the streamed 2D object properties, based on previously matched and constructed 3D properties of objects accessed from definition database 112. Further, object database 122 may store the streamed 2D object properties and 3D object properties for future reference.

In addition, by video processor 316, video processor 318, and sensor processor 319 identifying and classifying object properties and by geometry processor constructing 3D object properties 110, each of the processors may identify detected objects, including behaviors of monitored people. For example, video processor 316, video processors 318, sensor processor 319, and geometry processor 320 may access definition database 112, which includes behavior definitions for use in mapping facial expressions and other body movements, performing facial and other body movement recognition, and performing additional processing to identify an object representing a behavior. In addition, video processor 316, video processors 318, sensor processor 319, and geometry processor 320 may access definition database 112, which includes behavior definitions for different types of environments for use in identifying a particular environment in which a user is located based on detected objects and background. Further, in constructing 3D object properties 110, video processor 316, video processors 318, sensor processor 319, and geometry processor 320 may identify multiple detected objects in the environment and therefore identify multiple behaviors of a single monitored person or one or more interactions between multiple people. By monitoring and identifying interactions between objects detected in the environment in which the object is located, more accurate prediction of a behavior in the context in which the behavior is made may be performed.

Figure 4:
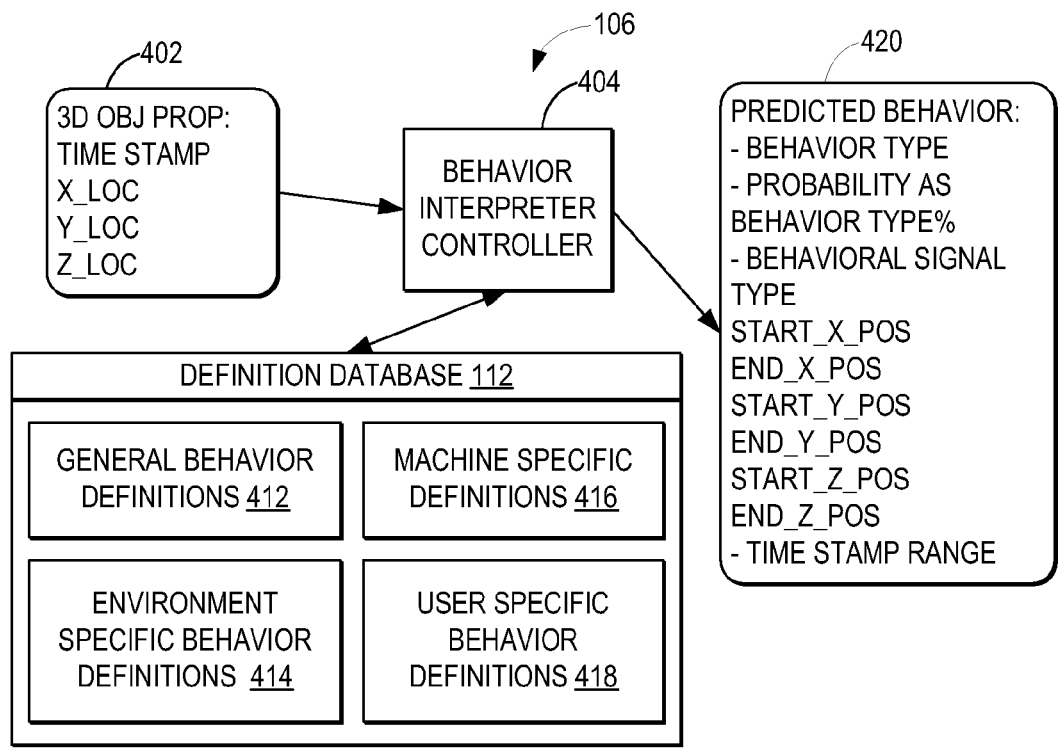
FIG. 4 is a block diagram depicting one embodiment of a behavior interpreter system.

Referring now to FIG. 4, a block diagram illustrates one embodiment of a behavior interpreter system. It is important to note that the multiple components depicted within behavior interpreter 106 may be incorporated within a single system or distributed via a network across multiple systems. In the example, a 3D properties record 402 includes "time stamp", "x_loc", "y_loc", and "z_loc" data elements. It will be understood that 3D properties record 402 may include additional or alternate data elements as determined by geometry processor 320 of FIG. 3. For example, 3D properties record 402 may include additional information identifying a particular or relative location of a user within a sensor area and not just within the focus area, colors, and other data collected by image capture devices and sensors and processed within 3D object detector 104.

Behavior interpreter 106 includes a behavior interpreter controller 404, where behavior interpreter controller 404 may include one or more processors programmed to perform behavior interpretation. For example, behavior interpreter controller 404 may include a processor with the CellBE architecture, programmed to efficiently process 3D object properties data streams, predict behaviors of monitored people from the 3D object properties streams, and predict whether the behaviors represent behavioral signals for directing the control of a machine. In addition, behavior interpreter controller 404 may include processors upon which software runs, where the software directs processing of 3D object properties streams, predicts behaviors of monitored people from the 3D object properties streams, and predicts whether the behaviors represent behavioral signals for directing the control of a machine.

In processing 3D object properties streams, predicting behaviors, and predicting whether behaviors represent behavioral signals for the directing the control of a machine, behavior interpreter controller 404 maps 3D object properties to one or more behavior definitions with a percentage probability that the streamed 3D object properties represent the mapped behavior definitions and with a percentage probability that the predicted behavior represents a behavioral signal for directing the control of a machine. In particular, behavior interpreter controller 404 accesses one or more behavior definitions for one or more behaviors and determines whether the 3D object properties match one or more characteristics of one or more behaviors as defined in one or more of the behavior definitions. Behavior definitions may include mapped 3D models of one or more types of behaviors. In addition, behavior definitions may define the parameters of identifying characteristics of a behavior including, but not limited to, body part detected, type of movement, surface characteristics, shape, speed of movement, frequency, span of movement, depth of movement, temperature, and color.

In addition, behavior definitions are specified to enable behavior interpreter controller 404 to determine whether characteristics of a behavior indicate that the behavior is representative of a behavioral signal for directing the control of a machine. For example, once behavior interpreter controller 404 determines that an object stream represents a behavior of "pointing an arm" by a person on an air tarmac from one or more behavior definitions, behavior interpreter controller 404 determines whether the person pointing the arm is a person whose behaviors represent behavioral signals for directing the control of a traffic signal, such as ground crew, and whether person's stance, direction of arm movement, intensity of movement and other body positions indicate that the behavior represent a behavioral signal for controlling the direction of an airplane. A ground crew controller may point with an arm to give directions to someone else on the ground, where behavior interpreter controller 404, based on characteristics defined in the behavior definition, would distinguish arm pointing to give directions from arm pointing representing a behavioral signal for directing a pilot to park a plane.

It is important to note that in interpreting 3D object properties streams, behavior interpreter controller 404 performs an aggregate analysis of all the tracked objects in one or more 3D object properties streams identified for a particular focus area by one or more behavior processing systems. In one example, behavior interpreter controller 404 aggregates the 3D object property streams for a particular focus area and particular sensor area. In another example, behavior interpreter controller 404 may receive multiple 3D object properties streams from areas overlapping a focus area and sensor area, analyze the 3D object properties streams for similarities, location indicators, and orientation indicators, and construct the 3D object properties streams into a 3D aggregate representation of an area.

In one embodiment, behavior interpreter controller 404 may map the aggregate of the tracked objects directly into a single behavior definition. In another embodiment, behavior interpreter controller 404 maps multiple aggregated tracked objects into multiple behavior definitions. For example, a person may simultaneously communicate through facial behavior and a hand behavior, where in predicting the actual behaviors communicated through the tracked movement of the facial behavior and hand behavior, behavior interpreter controller 404 analyzes the 3D object properties of the facial behavior in correlation with the 3D object properties of the hand behavior and accesses behavior definitions to enable prediction of each of the behaviors and to enable prediction of whether the behaviors, in combination, represent behaviors representing a behavioral signal for directing the control of a machine. Additionally, behavior interpreter controller 404 may aggregate the tracked objects representative of behavior by multiple monitored people within an environment. Behavior interpreter controller 404 then predicts whether the combination of behaviors by multiple monitored people is representative of behavioral signals for directing the control of a machine.

In the example, behavior interpreter controller 404 accesses behavior definitions from definition database 112, which includes general behavior definitions 412, environment specific behavior definitions 414, machine specific definitions 416, and user specific behavior definitions 418. It will be understood that definition database 112 may include additional or alternate types of behavior definitions. In addition, it is important to note that each of the groupings of behavior definitions illustrated in the example may reside in a single database or may be accessed from multiple database and data storage systems via a network.

General behavior definitions 412 include behavior definitions for common behaviors. For example, general behavior definitions 412 may include behaviors definitions for common behaviors, such as a person pointing, a person waving, a person nodding "yes" or shaking one's head "no", or other types of common behaviors.

Environment specific behavior definitions 414 include behavior definitions and factors for predicting a behavior and predicting whether a behavior represents a behavioral signal for directing the control of a machine that are specific to the context in which the behavior is being detected. Examples of contexts may include, but are not limited to, the current location of a monitored person, the machine with which a monitored person interacts or is within a particular proximity of, the time of day, the cultural meanings behind gestures and other behaviors within the context, the languages spoken within the context, and other factors that influence the context in which behavior could be interpreted. The current location of a monitored person may include the country or region in which the person is located and may include the actual physical environment, such as a traffic intersection, an assembly line in a manufacturing plant, a construction site, an arena, or other places where the behaviors of a person are monitored and interpreted to determine whether the behavior represents a behavioral signal for directing the control of a machine. Behavior interpreter controller 404 may detect current context from accessing a GPS indicator of a monitored person location, from performing speech analysis of the monitored person's speech to detect variations in language and dialect, from detecting objects within the image data indicative of particular types of locations, or from receiving additional data from other systems monitoring the context in which a monitored person is monitored.

Machine specific definitions 416 include behavior definitions specific to the machines controlled by the machine control system to which predicted behavior output 108 will be sent. For example, as will be further described with reference to FIG. 7, predicted behavior output 108 may be output to a machine control system that directs control signals to an automated traffic signal controller, to on-board vehicle navigation systems, and to an automated officer dispatch system, wherein selected behavior definitions focus on the types of behaviors that would be relevant for one or more of these types of systems.

In another example, predicted behavior output 108 may be output to a behavior-enabled application, such as a behavior-enabled operating system, where selected behavior definitions focus on the types of behaviors that would be relevant for directing an operating system to control signals to output interfaces or other components of a computer system. For example, a machine specific definition may specify a user cupping a hand around an ear, which represents a behavioral signal for directing the operating system to generate a control signal for increasing the volume of a speaker.

In addition, machine specific behavior definitions 416 include object definitions for the machine that enable detection of a particular process or movement performed by a machine. For example, machine specific behavior definitions 416 may include definitions for identifying a particular process of a machine based on the detected movement of the machine where a user behavior changes in meaning depending on which process the behavior occurs during.

User specific behavior definitions 418 include behavior definitions specific to a particular person being monitored. In one example, behavior interpreter controller 404 accesses an identifier for a monitored person from scanning for an RFID on a badge worn by the monitored person. In another example, behavior interpreter controller 404 accesses an identifier for a monitored person from comparing an attribute of the person detected by 3D object detector 104, with a database of user attributes. For example, behavior interpreter controller 404 may perform facial or voice recognition. It will be understood that behavior interpreter controller 404 may perform other types of identity access and authentication of a monitored person. In addition, behavior interpreter controller 404 may not identify the actual identity of a monitored person, but may identify attributes of a person that identify the person as a type of person whose behaviors are authorized to represent behavioral signals for directing the control of a machine.

Definition database 112 may also include behavior definitions and other factors specified according to a level of experience of a monitored person within a particular environment. For example, if a monitored person is a new trainee for a particular job, behavior definitions may be tailored to the common characteristics of behaviors by a new trainee that may represent behavioral signals for directing the control of a machine.

In addition, definition database 112 may also include behavior definitions and other factors specified according to a level of security required within a particular environment. For example, within a detention environment, a behavior definition may require an additional level of authentication for a person for that person to be authorized to make the behavioral signal. In another example, behavior definitions may require in a secured environment that any unauthorized persons are a minimum distance away from a secured point for a behavioral signal by an authorized user requesting passage through the secured point to be honored. It will be understood that other security based characteristics may be added to behavior definitions such that behavioral signals for directing the control of certain machines are limited to only authorized users operating under properly secured conditions.

Further, within the available behavior definitions, a behavior definition may be associated with a particular area of movement or a particular depth of movement within a 3D focus area. In particular, the three-dimensional focus area in which movement is detected may be divided into three-dimensional portions, where movements made in each of the portions may be interpreted under different selections of behavior definitions. For example, one three-dimensional portion of a focus area may be considered an "active region" where movement detected within the area is compared with a selection of behavior definitions associated with that particular active region, such as a region within a particular distance of an assembly line machine.

Additionally, within behavior definitions included within definition database 112, the predictability of a behavior may be increased by the presence of associated audio signatures or translated text from audio. In particular, sensor 240 or another audio sensor may detect audio from an environment or from a specific person. Behavior interpreter controller 404 may determine whether sensed audio increases the probability that a detected movement represents a particular type of behavior. In one example, behavior interpreter controller 404 may convert audio signals into text and determine whether the text matches types of words typically associated with a behavioral signal. In another example, behavior interpreter controller 404 may analyze audio signatures to predict the source of the audio and characteristics, such as a machine engine where the audio does not match the audio of a properly functioning engine, and determine whether the sensed audio source and characteristics matches types of audio signatures typically associated with a behavioral signal.

The behavior definitions included within definition database 112 may be added to or adjusted based on user feedback of a monitored person in a similar manner as a speech recognition system is trained to more accurately map and predict behaviors. For example, definition database 112 may learn additional behavior definitions and adjust the parameters of already learned behavior definitions through a monitored person indicating whether a control signal generated responsive to a behavior is the control signal intended to be triggered by the user's behavioral signal.

Behavior interpreter controller 404 may output predicted behavior output 108 in the form of one or more behavior records, such as behavior record 420. Behavior record 420 indicates the "behavior type", "probability %" as the behavior", and "behavioral signal type". The "behavioral signal type" may indicate, for example, a percentage probability of the behavior as a behavioral signal. In another example, the "behavioral signal type" may indicate the type of environment in which the behavioral signal is applicable or the type of machine the behavioral signal is predicted as directing. In addition, the "behavioral signal type" may include additional or alternate types of data gathered by behavior interpreter 404 in predicting a behavior type and predicting whether that behavior type represents a behavioral signal for directing control of a machine. Alternatively, a machine control system receiving behavior recording 420 may predict, from the behavior type and probability % as the behavior, whether the behavior type represents a behavioral signal for controlling a machine to which the machine control system sends control signals.

In addition, as illustrated, behavior record 420 includes the start X, Y, and Z axis properties and ending X, Y, and Z axis properties of the detected behavior, indicative of the location, direction of movement, and speed of movement of the behavior, listed as "start_x_pos", "end_x_pos", "start_y_pos", "end_y_pos", "start_z_pos", "end_z_pos", and the time stamp range indicating the times over which the behavior is detected. In addition or alternatively, behavior record 420 may include indicators of the location, direction of movement, intensity of movement, and speed of movement of the monitored person. Further, additional information acquired from sensors, such as RFID data, GPS coordinates, skin surface characteristics, and other sensed data, may be associated with a particular behavior record or included in a separate object record.

In passing behavior record 420, behavior interpreter controller 404 may filter out particular types of behavior records. For example, behavior interpreter controller 404 may not pass records where the predictability of a behavior as a behavior type is less than a particular percentage. In addition, in passing behavior record 420, behavior interpreter controller 404 may filter one type of behavior records for passing to one type of machine control system and filter other types of behavior records for passing to another type of machine control system.

Figure 5:
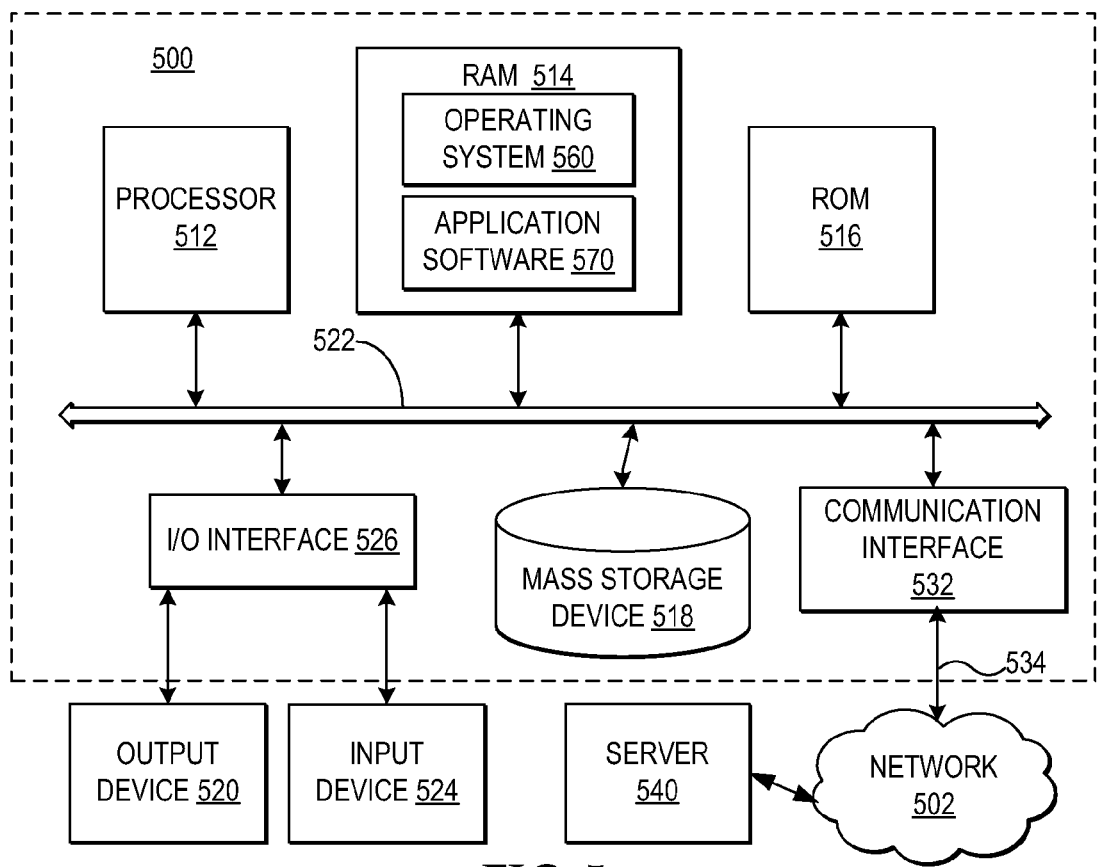
FIG. 5 is a block diagram illustrating one embodiment of a computing system in which the present invention may be implemented.

With reference now to FIG. 5, a block diagram depicts one embodiment of a computing system in which the present invention may be implemented. The controllers and systems of the present invention may be executed in a variety of systems, including a variety of computing systems, such as computer system 500, communicatively connected to a network, such as network 502.

Computer system 500 includes a bus 522 or other communication device for communicating information within computer system 500, and at least one processing device such as processor 512, coupled to bus 522 for processing information. Bus 522 preferably includes low-latency and higher latency paths that are connected by bridges and adapters and controlled within computer system 500 by multiple bus controllers. When implemented as a server, computer system 500 may include multiple processors designed to improve network servicing power. Where multiple processors share bus 522, an additional controller (not depicted) for managing bus access and locks may be implemented.

Processor 512 may be a general-purpose processor such as IBM's PowerPC™ processor that, during normal operation, processes data under the control of an operating system 560, application software 570, middleware (not depicted), and other code accessible from a dynamic storage device such as random access memory (RAM) 514, a static storage device such as Read Only Memory (ROM) 516, a data storage device, such as mass storage device 518, or other data storage medium. In one example, processor 512 may further implement the CellBE architecture to more efficiently process complex streams of data in 3D. It will be understood that processor 512 may implement other types of processor architectures. In addition, it is important to note that processor 512 may represent multiple processor chips connected locally or through a network and enabled to efficiently distribute processing tasks.

In one embodiment, the operations performed by processor 512 may control 3D behavior detection from captured images and data for an environment in which a person may communicative through behaviors, recognizing the behaviors, determining which behaviors represent behavioral signals for directing the control of a machine, and controlling output of a control signal triggered by the behavioral signal to a machine controller depicted in the operations of flowcharts of FIGS. 11-14 and other operations described herein. Operations performed by processor 512 may be requested by operating system 560, application software 570, middleware or other code or the steps of the present invention might be performed by specific hardware components that contain hardwired logic for performing the steps, or by any combination of programmed computer components and custom hardware components.

The present behavior processing system and behavior-enabled machine control system may be provided as a computer program product, included on a computer or machine-readable medium having stored thereon the executable instructions of a computer-readable program that when executed on computer system 500 cause computer system 500 to perform a process according to the present invention. The terms "computer-readable medium" or "machine-readable medium" as used herein includes any medium that participates in providing instructions to processor 512 or other components of computer system 500 for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 500 can read and which is suitable for storing instructions. In the present embodiment, an example of a non-volatile medium is mass storage device 518 which as depicted is an internal component of computer system 500, but will be understood to also be provided by an external device. Volatile media include dynamic memory such as RAM 514. Transmission media include coaxial cables, copper wire or fiber optics, including the wires that comprise bus 522. Transmission media can also take the form of acoustic or light waves, such as those generated during radio frequency or infrared data communications.

Moreover, the present invention may be downloaded or distributed as a computer program product, wherein the computer-readable program instructions may be transmitted from a remote computer such as a server 540 to requesting computer system 500 by way of data signals embodied in a carrier wave or other propagation medium via network 502 to a network link 534 (e.g. a modem or network connection) to a communications interface 532 coupled to bus 522. In one example, where processor 512 includes multiple processor elements, then a processing task distributed among the processor elements, whether locally or via a network, may represent a computer program product, where the processing task includes program instructions for performing a process or program instructions for accessing Java (Java is a registered trademark of Sun Microsystems, Inc.) objects or other executables for performing a process. Communications interface 532 provides a two-way data communications coupling to network link 534 that may be connected, for example, to a local area network (LAN), wide area network (WAN), or directly to an Internet Service Provider (ISP). In particular, network link 534 may provide wired and/or wireless network communications to one or more networks, such as network 502. Further, although not depicted, communication interface 532 may include software, such as device drivers, hardware, such as adapters, and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

Network link 534 and network 502 both use electrical, electromagnetic, or optical signals that carry digital data streams. The signals through the various networks and the signals on network link 534 and through communication interface 532, which carry the digital data to and from computer system 500, may be forms of carrier waves transporting the information.

In addition, computer system 500 may include multiple peripheral components that facilitate input and output. These peripheral components are connected to multiple controllers, adapters, and expansion slots, such as input/output (I/O) interface 526, coupled to one of the multiple levels of bus 522. For example, input device 524 may include, for example, a microphone, a video capture device, a body scanning system, a keyboard, a mouse, or other input peripheral device, communicatively enabled on bus 522 via I/O interface 526 controlling inputs. In addition, for example, an output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

Figure 6:
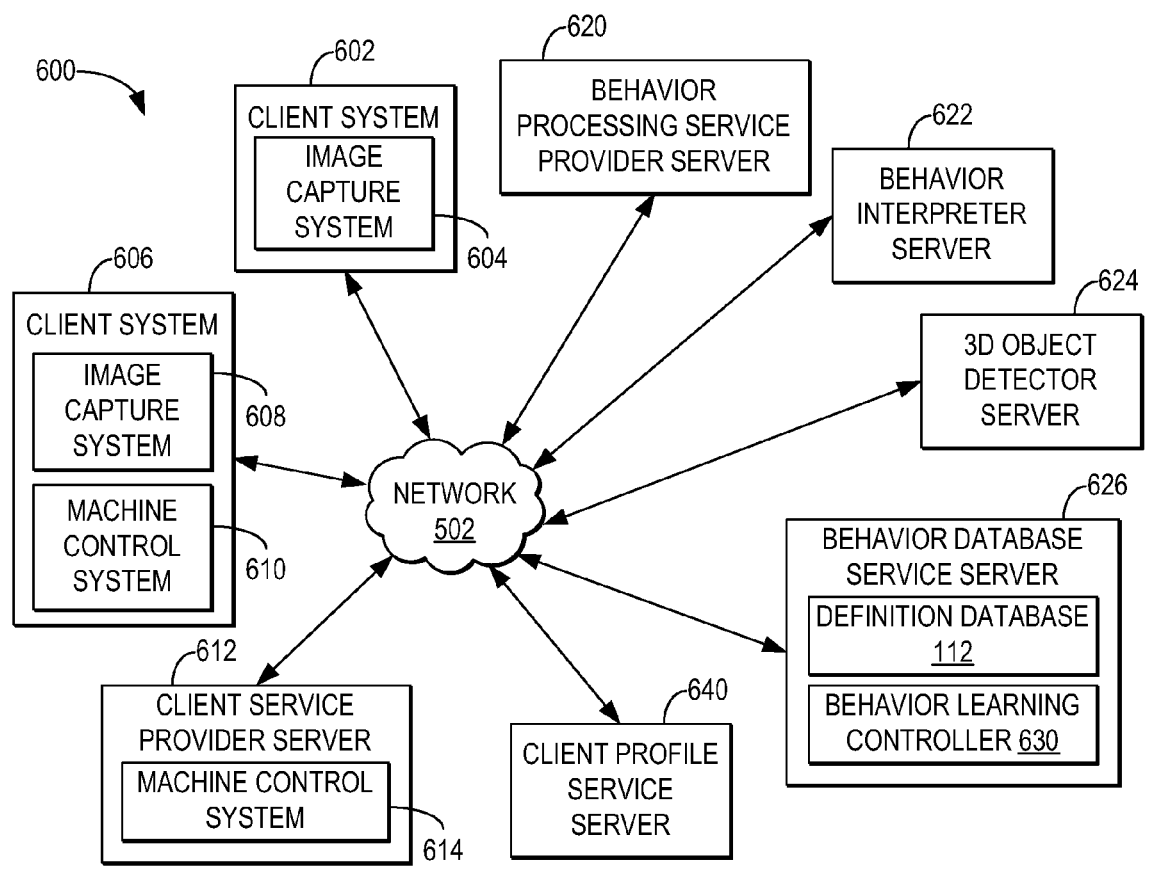
FIG. 6 is a block diagram depicting one example of a distributed network environment in which a behavior-enabled machine control method, system, and program product may be implemented.

Referring now to FIG. 6, a block diagram depicts one example of a distributed network environment in which a behavior-enabled machine control method, system, and program may be implemented. It is important to note that distributed network environment 600 is illustrative of one type of network environment in which the behavior-enabled machine control method, system, and program may be implemented, however, the behavior-enabled machine control method, system, and program may be implemented in other network environments. In addition, it is important to note that the distribution of systems within distributed network environment 600 is illustrative of a distribution of systems; however, other distributions of systems within a network environment may be implemented. Further, it is important to note that, in the example, the systems depicted are representative of the types of systems and services that may be accessed or request access in implementing a behavior processing system and a behavior-enabled machine control system. It will be understood that other types of systems and services and other groupings of systems and services in a network environment may implement the behavior processing system and behavior-enabled machine control system.

As illustrated, multiple systems within distributed network environment 600 may be communicatively connected via network 502, which is the medium used to provide communications links between various devices and computer communicatively connected. Network 502 may include permanent connections such as wire or fiber optics cables and temporary connections made through telephone connections and wireless transmission connections, for example. Network 502 may represent both packet-switching based and telephony based networks, local area and wide area networks, public and private networks. It will be understood that FIG. 6 is representative of one example of a distributed communication network for supporting a behavior processing system and behavior-enabled machine system; however other network configurations and network components may be implemented.

The network environment depicted in FIG. 6 may implement multiple types of network architectures. In one example, the network environment may be implemented using a client/server architecture, where computing systems requesting data or processes are referred to as clients and computing systems processing data requests and processes are referred to as servers. It will be understood that a client system may perform as both a client and server and a server system may perform as both a client and a server, within a client/server architecture. In addition, it will be understood that other types of network architectures and combinations of network architectures may be implemented.

In the example, distributed network environment 600 includes a client system 602 with an image capture system 604 and a client system 606 with an image capture system 608. In one example, image capture systems 604 and 608 are stereoscopic image devices implementing one or more image capture devices, such as image capture devices 202 and 204, and may include one or more sensors, such as sensor 240. Image capture systems 604 and 608 capture images and other data and stream the images and other data to other systems via network 502 for processing. In addition, image capture systems 604 and 608 may include video processors for tracking object properties, such as video processor 316 and video processor 318, described with reference to FIG. 3 and a geometry processor for generating streams of 3D object properties, such as geometry processor 320, described with reference to FIG. 3.

In one example, each of client system 602 and client system 606 may stream captured image frames to one or more 3D object detection services. In one example, an behavior processing service provider server 620 provides a service that includes both an object detector service, such as 3D object detector 104, for processing streamed images and other data and an behavior interpreter service, such as behavior interpreter 106, for predicting a type of behavior, predicting a probability that the captured images represent the predicted type of behavior, and predicting whether the behavior represents a behavioral signal for directing control of a machine, and controlling output of the predicted behavior records to one or more other systems accessible via network 502.

As to behavior processing service provider server 620, different entities may implement a behavior processing service and different entities may access the behavior processing service. In one example, a user logged into one of client systems 602 or client system 606 may subscribe to the behavior processing service. In another example, an image capture system or a particular application requesting behavior processing may automatically stream captured images and data to the behavior processing service. In yet another example, a business or other entity may implement the behavior processing service in a communications network.

In another example, each of client system 602 and client system 606 may stream captured frames to a 3D object detector server 624. 3D object detector server 624 receives captured images and other data from image capture systems, such as stereoscopic image capture system 604 or image capture system 608, and processes the images and other data to generate 3D object properties of detected behaviors, for output to a behavior interpreter system, such as behavior interpreter server 622 or behavior processing service provider server 620. In additional or alternate embodiments, an object detector service may be implemented within one or more other systems, with one or more other services performed within those systems. In particular, in additional or alternate embodiments, a 3D object detector service may be implemented within a client system at which the images and other data are captured.

Each of the server systems described may be distributed across one or more systems. In addition, each of the server systems may be distributed across systems with 3D image processing power, including processors with the CellBE architecture programmed to perform efficient 3D data processing. In one example, an entity, such as a business or service provider, may implement separate server systems for object detection and behavior interpretation, wherein multiple behavior interpreter servers are implemented with each behavior interpreter server processing different types of 3D object properties.

Behavior processing service provider server 620, behavior interpreter server 622, and 3D object detector server 624 may locally store a definition database, such as definition database 112, of raw images, 3D behavior properties, behavior definitions, machine definitions, and other object definitions. In addition, behavior processing service provider server 620, behavior interpreter server 622 and 3D object detector server 624 may access a behavior database service server 626 that facilitates definition database 112.

In addition, behavior database service server 626 includes a behavior learning controller 630. Behavior learning controller 630 prompts users, to provide samples of particular types of behaviors which represent behavioral signals for directing the control of a machine and prompts users to indicate whether a predicted type of behavior matches an actual behavior. In addition, behavior learning controller 630 gathers other information that enables behavior learning controller 630 to learn and maintain behavior information in definition database 112 that when accessed by behavior object detector services and behavior interpreter services, increases the accuracy of generation of 3D object properties and accuracy of prediction of behaviors and whether behaviors represent behavioral signals from 3D object properties by these services.

Further, behavior processing service provider server 620, behavior interpreter server 622, 3D object detector server 624, or behavior database service server 626 may access additional context information for a user specifying the types of behaviors that represent behavioral signals by the user for directing the control of a machine from a client profile service server 640. In addition, client profile service server 640 may monitor and provide additional information about a location of a user from monitored information such as the current location of the user, the current physical environment in which the user is located, the events currently scheduled for a user. In one example, client profile service provider 640 monitors a user's electronic calendar or a user's current GPS location, for example, from the user's personal, portable telephony device.

Behavior processing service provider server 620 and behavior interpreter server 622 stream predicted behavior records, such as predict behavior record 420, to behavior-enabled applications via network 502. In the example embodiment, client system 606 includes a machine control system 610 which is a behavior-enabled machine control system, enabling client system 606 to determine and output control signals based on behavior records and other data, to one or more machines or to one or more controllers for one or more machines. Machine control system 610 at client system 606 may receive predicted behavior records from client system 606, as captured by image capture system 608, or may receive predicted behavior records based on images and data detected by image capture system 608 or other image capture systems.

In addition, in the example embodiment, client service provider server 612 includes a machine control system 614 which is a behavior-enabled machine control service for enabling client service provider server 612 to determine and output control signals based on behavior records and other data to subscribers. In particular, client service provider server 612 represents a server which provides a machine control service to one or more subscribing client systems. Machine control system 614 may receive behavior records for a particular environment from one or more systems and determine and output control signals to one or more client systems. For example, machine control system 614 may provide a service to multiple navigation systems, whether on-board a vehicle or accessed through a portable telephony device, where machine control system 614 generates navigational control signals for output to a subscriber interface based on behavioral signals by a user that may effect navigation.

Figure 7:
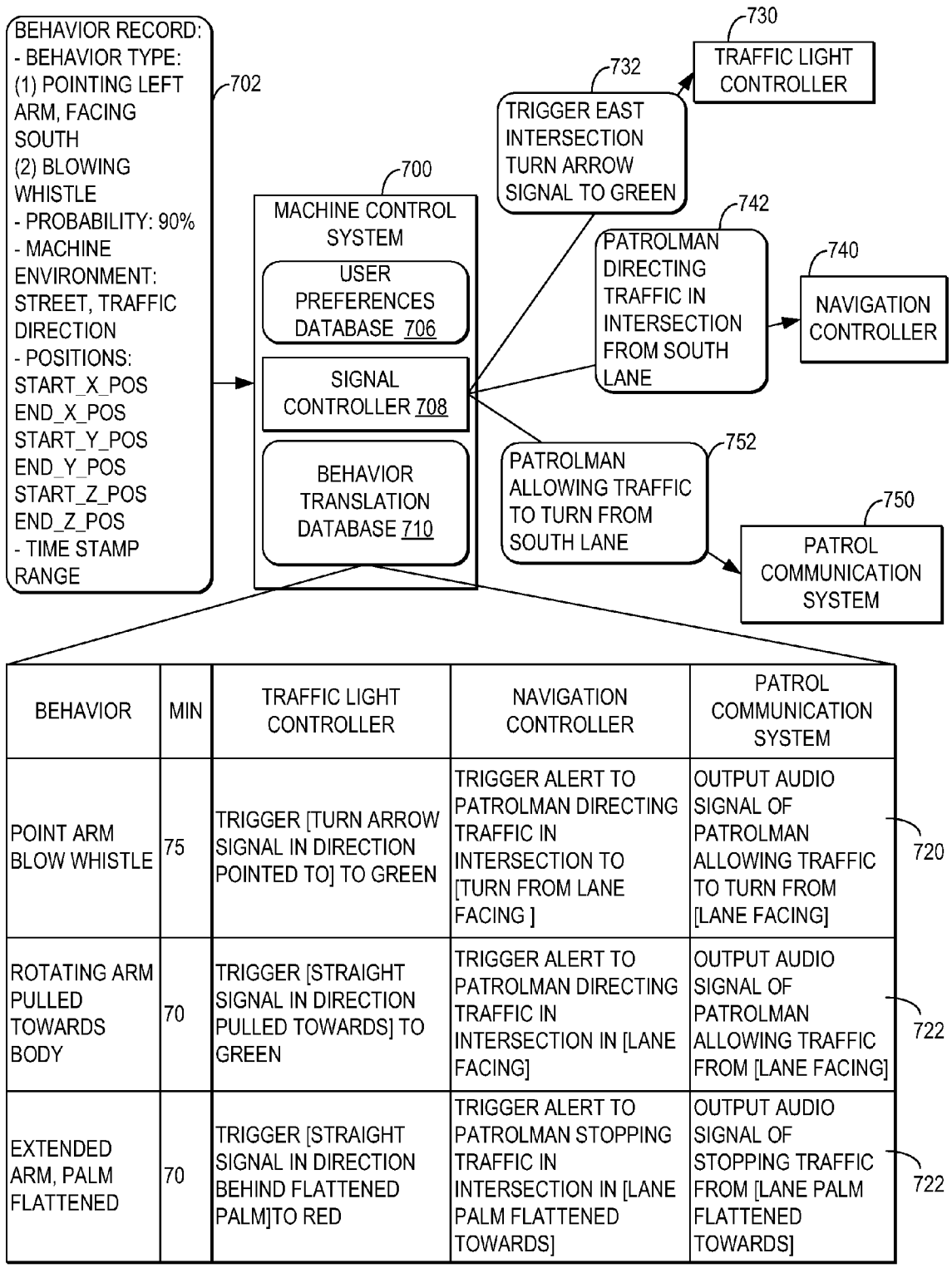
FIG. 7 is a block diagram illustrating one example of an implementation of a behavior processing system communicating with a behavior-enabled machine control system.

With reference now to FIG. 7, a block diagram illustrates one example of an implementation of a behavior processing system communicating with a behavior-enabled machine control system. Machine control system 700 receives predicted behavior records from behavior processing system 100, which enables machine control system 700 to generate control signals based on real-time, 3D images and other data representing behavioral signals captured for an actual environment. According to an advantage, machine control system 700 may generate and output control signals to directly control a machine or to communicate with a controller that then controls the operation of a machine based on the control signal.

In particular, signal controller 708 of machine control system 700 may base control signals on behavior records, such as behavior record 702. In addition, signal controller 708 may enhance or generate control signals based on other data, combined with the data included in behavior record 702. For example, signal controller 708 may access static or dynamic information about an environment in which a monitored person's behavioral signals are detected, through accessing structural maps, photographs, video streams, RFID information, and other data about the environment. In addition, signal controller 708 may access information about a monitored person within an environment, through other imaging devices. Then, signal controller 708 may generate a mapping of the predicted behavior records at locations within the monitored environment.

In particular, in the example, a behavior processing system 100 captures and predicts behaviors of a user as behavioral signals for traffic control. Machine control system 700 receives behavior record 702 from behavior processing system 100 and signal controller 708 translates behavior record 702 into inputs that facilitate modeling of an environment and generation of control signals for machines. In the embodiment depicted, in translating behavior record 702, signal controller 708 accesses one or more entries in behavior translation database 710 based on the predicted types of behaviors or the predicted type of behavioral signals. For example, entries 720, 722 and 724 represent entries in behavior translation database 710 related to the predicted type of behavioral signals of traffic control specified in behavior record 702.

Machine control system 700 may access entries representing behavior translation database 710 locally or via a network connection. In selecting entries to include in behavior translation database 710 or to apply to behavior records at a particular machine control system, preferences database 706 may specify, for a particular machine control system, preferences as to the types of entries to access and the types of controllers for which control signals should be generated.

In the example, behavior translation database 710 includes, for each entry, data specified in multiple categories. In particular, in the example, each entry includes a behavior type and a minimum (min) probability percentage and then instructions for generating control signals, if applicable, to each of a traffic light controller, a navigation controller, and a patrol communication system. Each entry may include additional or alternate categories of data, types of control signal rules, and types of controllers.

In particular, in the example, a monitored behavior included in behavior record 702 predicts that a monitored person is (1) pointing a left arm to the left while facing south; and (2) blowing a whistle, with a 90% probability that the behaviors are accurately predicted In addition, behavior record 702 indicates that the predicted behavior signal type is for "traffic control" and the 3D positions of the behaviors are indicated In the example, signal controller 708 may control signals to one or more of the devices illustrated. For the example, signal controller 708 compares behavior record 702 with entry 720 of behavior translation database 720 and may generate and control output of control signals to one or more of a traffic light controller 730, a navigation controller 740, and a patrol communication system 750 based on instructions generated from comparing behavior record 702 and other collected data with entry 720. It will be understood that signal controller 708 may output control signals to additional or alternate types of output devices and to multiple of a same type of output device.

In generating control signals based on behavior record 702, in a first example, signal controller 708 generates a control signal for output to a traffic light controller 730, where traffic light controller 730 controls the functioning of one or more traffic signal lights. The rule for traffic light controller 730 in entry 720 specifies generating a control signal to "trigger [turn arrow signal in direction pointed to] to green." Based on the rule illustrated in entry 720 and the data included in behavior record 702, signal controller 708 generates a control signal of "trigger east instruction turn arrow signal to green", as illustrated as reference numeral 732. In particular, signal controller determines that because the user is facing south, but pointing with the left arm to the left of the body, the user is directing traffic entering from the south to turn towards the east. By detecting a traffic officer or authorized person directing traffic within an intersection and generating control signals for a traffic light controller, a traffic light controller may adjust signal lights at an intersection to correspond with the directions of a traffic officer.

In another example, in generating control signals based on behavior record 702, signal controller 708 may generate a control signal for output to navigation controller 740, where navigation controller 740 may represent a navigation controller on-board a vehicle or telephony device that detects local area navigation control signal broadcasts, a navigation service from a server that distributes navigation control signals to subscribers, or other types of navigation control systems. The rule for navigation controller 740 in entry 720 specifies generating a control signal to "trigger alert to patrolman directing traffic in intersection for [the lane facing]". Based on the rule illustrated in entry 720 and data included in behavior record 702, signal controller 708 generates a control signal of "patrolman directing traffic in intersection from south lane" as illustrated at reference numeral 742. By detecting that a patrolman is directing traffic at an intersection, predicting behavioral signals based on captured 3D image streams, and converting the behavioral signals into control signals for a navigation system, a navigation system controller may update a subscriber with real-time indicators and interpretation of behavioral signals by a patrol officer for improved safety.

In yet another example, in generating control signals based on behavior record 702, signal controller 708 may generate a control signal for output to patrol communication system 750, where patrol communication system 750 represents a communication system for controlling transmissions of communications between officers. In one example, each officer may carry or wear a portable device enabled to detect secured communications from patrol communication system 750. The rule for patrol communication system in entry 720 specifies generating a control signal to "output audio signal that patrolman allowing traffic to turn from [lane facing]." Based on the rule illustrated in entry 720 and data included in behavior record 702, signal controller 708 generates a control signal of "patrolman allowing traffic to turn from south lane" as illustrated at reference numeral 752. By translating the behavioral signals of a patrol officer into a control signal for generating audio output at patrol communication system 750, patrol communication system 750 may detect and inform other patrol officers of the flow of traffic directed by a first patrol officer for improved safety and communication in a scenario where a patrol officer communicates primarily through behavioral signals.

In addition to entry 720, entries 722 and 724 of behavior translation database 710 are further illustrative of types of entries that may translate behaviors within a traffic control environment into control signals. For example, entry 722 specifies rules for generating control signals for a behavior of "rotating arm pulled towards body", of a first rule of "trigger [straight signal in direction pulled towards] to green" for a traffic light controller, a second rule of "trigger alert to patrolman directing traffic in intersection from lane facing]" for a navigation controller, and a third rule of "output audio signal of patrolman allowing traffic from [lane facing]" for a patrol communication system. In another example, entry 924 specifies rules for generating control signals for a behavior of "extended arm, palm flattened", of a first rule of "trigger [straight signal in direction behind flattened palm] to red" for a traffic light controller, a second rule of "trigger alert to patrolman stopping traffic in intersection in [lane palm flattened towards]" for a navigation controller, and a third rule of "output audio signal of stopping traffic from [lane palm flattened towards]" for a patrol communication system.

It is important to note that while in the embodiment traffic light controller 730, navigation controller 740 and patrol communication 750 are each described as systems separate from machine control system 700, each controlling one or more other machines, each of traffic light controller 730, navigation controller 740, and patrol communication system 750 may be integrated into machine control system 700 or may integrate signal controller 708 and behavior translation database 710.

In addition, it is important to note that the rules included within behavior translation database 710 may include additional types of factors and criteria. For example, a rule within behavior translation database 710 may convert a speed of a waving arm or the distance to a waving flag into a speed requirement for a machine in a control signal for the machine. Similarly, behavior translation database 710 may detect if the person stops waving an arm and convert the lack of waving into a braking requirement for a machine in a control signal for the machine. For example, if a ground crew member's speed of waving controls the speed of a plane, if the ground crew member stops waving, a control signal to apply the plane brake should be generated to provide a safety cut-off system.

Further, it is important to note that behavior translation database 710 may determine whether the convert a predicted behavior type into a control signal based on the presence of other types of input by a person. For example, a behavior translation rule for converting a behavior by a user captured by a security system into a control signal for an automated security dispatch system may require detecting a particular behavior and detecting the user enter a particular pin code, detecting a particular behavior and detecting that the user has not entered a required pin code by a required time period, or detecting the user perform a particular series of behaviors.

With reference now to FIG. 8, a block diagram illustrates one example of a portable image capture system communicatively connected to a behavior processing system for predicting behaviors representing behavioral signals for directing the control of a machine. In the example, FIG. 8 includes a headpiece 800, which is a wearable apparatus. In one example, a user wears headpiece 800, which is illustrated as a pair of glasses. In an additional or alternate embodiment, headpiece 800 may represent other types of wearable apparatus.

In the example, image capture device 202 and image capture device 204 are each affixed to headpiece 800. Each of image capture device 202 and image capture device 204 capture video image streams and other types of sensed data. Each of image capture devices 202 and image capture device 204 may transmit images and data to a computer system 812 implementing a behavior processing system 100 through a wired connection or through transmissions by a wireless transmitter 810 affixed to headpiece 800.

In one example, computer system 812 is a local, mobile computing system, such as computer system 500, carried or worn by a user wearing headpiece 800. For example, computer system 812 as a local, mobile computing system may be implemented in, for example, a hip belt attached computing system, a wireless telephony device, or a laptop computing system. In another example, computer system 812 remains in a fixed position or is worn by a user, but receives wireless transmissions from wireless transmitter 810 or other wireless transmitters within the broadcast reception range of a receiver associated with computer system 812.

Behavior processing system 100 may run within computer system 812 or may interface with other computing systems providing behavior processing services to process captured images and data and return a predicted gesture from the captured images and data, as illustrated in FIG. 6. In particular, computer system 812 may include a wired or wireless network interface through which computer system 812 interfaces with other computing systems via network 502.

In one example, image capture device 202 and image capture device 204 are positioned on headpiece 800 to capture a focus area from directly in front of the user to a distance extended in front of the user, such as several yards in front of the user. By the focus area including the area directly in front of the user, image capture device 202 and image capture device 204 may capture images of behaviors made by the user wearing headpiece 800. In addition, by the focus area including the area extending in front of the user, image capture device 202 and image capture device 204 may capture images of behaviors of other people. Further, image capture device 202 and image capture device 204 may be positioned on headpiece 800 to capture areas to the side, above, and behind a user, dependent upon an environment in which a user is within.

Behavior processing system 100 processes the images and data captured by image capture device 202 and image capture device 204, and generates a behavior record. In one embodiment, behavior processing system 100 may pass the behavior record to a local machine control system, such as behavior-enabled notification system 820. In another embodiment, behavior processing system 100 may pass the behavior recording to a separate machine control system 822 via network 502. As previously described with reference to FIG. 7, a behavior-enabled notification system or machine control system may translate a behavior record into a control signal for controlling one or more machines.

In the example, behavior-enabled notification system 820 generates control signals for controlling output of audio signals to audio output devices 806 and 808 via wireless transmitter 810. In one embodiment, behavior processing system 100 passes a behavior record to behavior-enabled notification system 820 and behavior-enabled notification system 820 translates the behavior record into an audio control signal, if applicable and controls output of the audio control signal to wireless transmitter 810 for output of the audio signal via audio output devices 806 and 808. In another embodiment, behavior-enabled notification system 820 receives a behavior record or control signal via network 502 and processes the behavior record or control signal into an audio control signal, if applicable, and controls output of the audio control signal to wireless transmitter 810.

In one embodiment, multiple people may each wear a separate headpiece, where the images captured by the image capture devices on each headpiece are transmitted to a same computer system, such as computer system 812, via a wireless or wired network connection. By gathering collaborative images and data from multiple people, behavior processing system 100 may more accurately detect objects representative of behaviors and more accurately predict the type of behavior and whether the behavior represents a behavioral signal for directing the control of a machine. Further, it is important to note that multiple local mobile computer systems, each gathering images and data from image capture devices and sensors affixed to a headpiece may communicate with one another via a wireless or wired network connection and share gathered images, data, detected objects, predicted behaviors, and whether the predicted behaviors represent behavioral signals for directing the control of machines.

Where collaborative images and data are gathered at a single system or shared among multiple systems, additional information may be added to or extracted from the images and data to facilitate the placement of different sets of captured images and data relative to other sets of captured images and data. For example, images and data transmitted for collaboration may include location indicators and orientation indicators, such that each set of images and data can be aligned and orientated to the other sets of images and data.

Referring now to FIG. 9, an illustrative diagram illustrates one example of a behavior processing system and behavior-enabled machine control system within a manufacturing environment. In the example, image capture system 904, which implements a stereoscopic image device of one or more image capture devices and sensors, capture images within a manufacturing environment area 910. In the example, an employee 912 and an employee 914 work alongside an assembly line conveyor 930. Image capture devices 904 pass the captured image streams to computer system 900 and behavior processing system 100 predicts behaviors and whether behaviors represent behavioral signals for directing the control of a machine from the captured image streams.

Within the manufacturing environment, the machines that can be controlled include a speed controller 932, which controls the speed of the conveyor belt, line shutoff controller 934, which quickly stops the conveyor belt, a medical dispatch controller 936, which automatically triggers a medical emergency dispatch request, and a supervisor notification controller 938, which automatically triggers audio notifications to a supervisor of employee 912 and employee 914.

In one example, behavior processing system 100 processes an image stream and compares the 3D image properties with assembly line speed definitions 924. Assembly line speed definitions 924 include behavior definitions for behaviors that represent behavioral signals for adjusting the speed of the conveyor belt. For example, based on assembly line speed definitions 924, employee 912 or employee 914 may use a particular motion, such as a "thumbs up" gesture, to trigger an increase in the speed of the assembly line conveyor belt, or a "thumbs down" gesture, to trigger a decrease in the speed of the assembly line conveyor belt. If behavior processing system 100 processes images and predicts a behavior of thumbs up, machine control system 700 translates the behavior into a control signal for increasing speed and transmits the control signal to speed controller 932. Speed controller 932 automatically adjusts the speed of the conveyor line based on the control signal received from machine control system 700.

In the example of speed control, assembly line speed definitions 924 may be specified so that behavior processing system 100 is only to predict a thumbs up signal is a behavior signal when one or more particular employees make the thumbs up signal. In another example, assembly line speed definitions 924 may be specified so that behavior processing system 100 is only to predict a "thumbs up" signal is a behavior signal if all the employees along a conveyor line make the "thumbs up" signal in agreement. In yet another example, assembly line speed definitions 924 may be specified so that behavior processing system 100 is only to predict a thumbs up signal is a behavior signal when the thumbs up signal is made within a particular proximity of the conveyor line or within a particular portion of area 910. Additional or alternate specifications may be added to assembly line speed definitions to add safety controls and limit unintentional behavior signals that would trigger changes in speed.

In a next example, behavior processing system 100 processes an image stream and compares the 3D image properties with assembly line error definitions 926. Assembly line error definitions 926 include definitions for behaviors that represent behavioral signals for quickly stopping a conveyor line. For example, based on assembly line error definitions 926, employee 912 or employee 914 may use a particular motion, such as a quick slashing motion with an arm, to trigger the shutdown of the conveyor line. In another example, based on assembly line error definitions 926, if employee 912 or employee 914 behave in a manner that suggests the employee is improperly or unsafely interacting with the conveyor line, even though the behavior is not intentionally a behavior signal for shutdown of the conveyor line, the behavior should be interpreted for directing shutdown of the conveyor line. Behavior processing system 100 passes behavior records with a behavior signal type of assembly line error to machine control system 700 and machine control system 700 generates a control signal for automatically forcing line shutoff controller 934 to shutoff the conveyor line.

It is important to note that while some behavior definitions may require behaviors indicating the user intends the behavior to represent a behavior signal, in other examples, such as an employee unsafely working at an assembly line, are still behaviors representing a behavior signal for directing the control of a machine. In another example, medical emergency definitions 922 and diminished capacity definitions 920 both include behavior definitions for behaviors indicating that an employee is impaired in some manner, the severity of which directing what type of behavioral signal is represented by the impairment. For example, in the manufacturing environment, it is important to monitor that employees remain alert and physically able to handle a job. Diminished capacity definitions 920 may include behavior definitions related to an employee losing concentration or becoming physically tired and these behaviors representing behavioral signals for directing the control of supervisor notification controller 938. Medical emergency definitions 922 may include behavior definitions related to an employee experiencing a medical condition requiring medical care and these behaviors representing behaviors signals for directing the control of medical dispatch controller 936. Diminished capacity definitions 920 and medical emergency definitions 922 may require processing images and predicting behaviors at a finer granularity, such as detecting changes in the eye movement of an employee.

Referring now to FIG. 10, an illustrative diagram illustrates one example of a behavior processing system and behavior-enabled machine control system within a machine control environment. In the example, image capture system 1004, which implements a stereoscopic image device of at least one image capture device and may include one or more sensors, capture images within a first 3D focus area 1006. In addition, in the example, image capture system 1008, which also implements a stereoscopic image device, capture images within a second 3D focus area 1010.

In particular, image capture system 1004 and image capture system 1008 capture 3D image streams for different focus areas associated with machine 1002. In one example, machine 1002 represents a crane, where focus area 1006 adjusts for image capture system 1004 to scan the area in which the crane arm is operating and focus area 1010 spans an area around the base of the crane around which other employees may signal a crane operator or auto pilot system to adjust the position of the crane arm. By gathering a first 3D image stream of the movement of the crane arm and any objects moved by the crane arm and gathering a second 3D image stream of the behaviors of other employees, behavior processing system 100 monitors areas that may not be visible to a crane operator or that may include people signaling to indicate the direction a crane arm should be moved.

In the example, behavior processing system 100 may detect behaviors by other employees for signaling an operator or auto-pilot system to raise or lower a crane arm, for example. Machine control system 700 receives the behavior record for the signal and generates a control signal for one or more of auto pilot controller 1020 and operator warning interface 1022. In one example, auto pilot controller 1020 controls the movement of machine 1002 based on a programmed movement plan, however, according to an advantage, machine controller system 700 may adjust the movement plan based on behavioral signals. In another example, operator warning interface 1022 provides a view of the images captured from image capture systems 1004 and 1008 or a composite map of an area from the captured images, wherein a machine operator looks at the interface to watch the crane arm and to see other people signaling the operator to make adjustments. According to an advantage, machine control system 700 may update operator warning interface 1022 with an indicator of the predicted signal from another persons signaling behavior.

In another example, machine 1002 may represent a plane or other machine where the operator of the machine relies on another person to provide signals to the operator and the operator controls the machine based on the signals. In addition, machine 1002 may represent a machine, such as a plane, that may operate in auto-pilot mode, where that mode is supplemented by behavioral signals by a person. Further, in the example, machine 1002 may be position in an environment where visual signals are preferable to verbal communication.

Referring now to FIG. 11, a high level logic flowchart depicts a process and program for a behavior processing system to predict behavior types and paths with a percentage probability. In the example, the process starts at block 1100, and thereafter proceeds to block 1102. Block 1102 depicts capturing, via a stereoscopic image device, multiple image streams and via sensors, sensor data, within a focus area. Next, block 1104 illustrates tracking objects within the images and sensor data. Thereafter, block 1106 depicts generating a stream of 3D object properties for tracked objects. Thereafter, block 1108 depicts aggregating the 3D object properties for each of the tracked objects. In particular, the aggregated 3D object properties represent one or more objects tracked in association with at least one monitored person representative of behaviors of the at least one monitored person. In addition, the aggregated 3D object properties may represent one or more objects tracked in associated with movement of one or more machines. Next, block 1110 illustrates predicting at least one type of behavior from the aggregated stream of 3D object properties from one or more behavior definitions that match the aggregated stream of 3D object properties with a percentage probability. In addition, next, block 1112 depicts predicting whether the predicted behavior represents a type of behavioral signal, including, but not limited to calculating a percentage probability that the predicted behavior represents a type of behavioral signal, determining whether a monitored person is authorized to trigger machine control with the predicted behavioral signal, and predicting one or more types of machine control that may be directed by the behavioral signal. Thereafter, block 1114 depicts transmitting each predicted type of behavior and the predicted type of behavioral signal in behavior records to a behavior-enabled application, such as a machine control system, and the process ends.

With reference now to FIG. 12, a high level logic flowchart depicts a process and program for behavior detection by tracking objects within image streams and other sensed data and generating 3D object properties for the tracked objects representative of behaviors. As illustrated, the process starts at block 1200 and thereafter proceeds to block 1202. Block 1202 depicts an object detector system receiving multiple image streams, via image capture devices, and sensed data, via one or more sensors and image capture devices. Next, block 1204 illustrates the object detector system attaching metadata to the image frames and sensed data, and the process passes to block 1206. In one example, metadata includes data such as, but not limited to, a camera identifier, frame number, timestamp, and pixel count.

Block 1206 depicts the object detector system processing each image stream and sensed data to detect and track objects, wherein objects may include physical objects and user movement indicative of a behavior. Next, block 1208 illustrates generating streams of tracked object properties with metadata from each image stream. Thereafter, block 1210 depicts combining the tracked object properties to generate 3D object properties with metadata. Next, block 1212 illustrates transmitting the 3D tracked object properties to a behavior interpreter system, and the process ends.

Figures 13, 14:
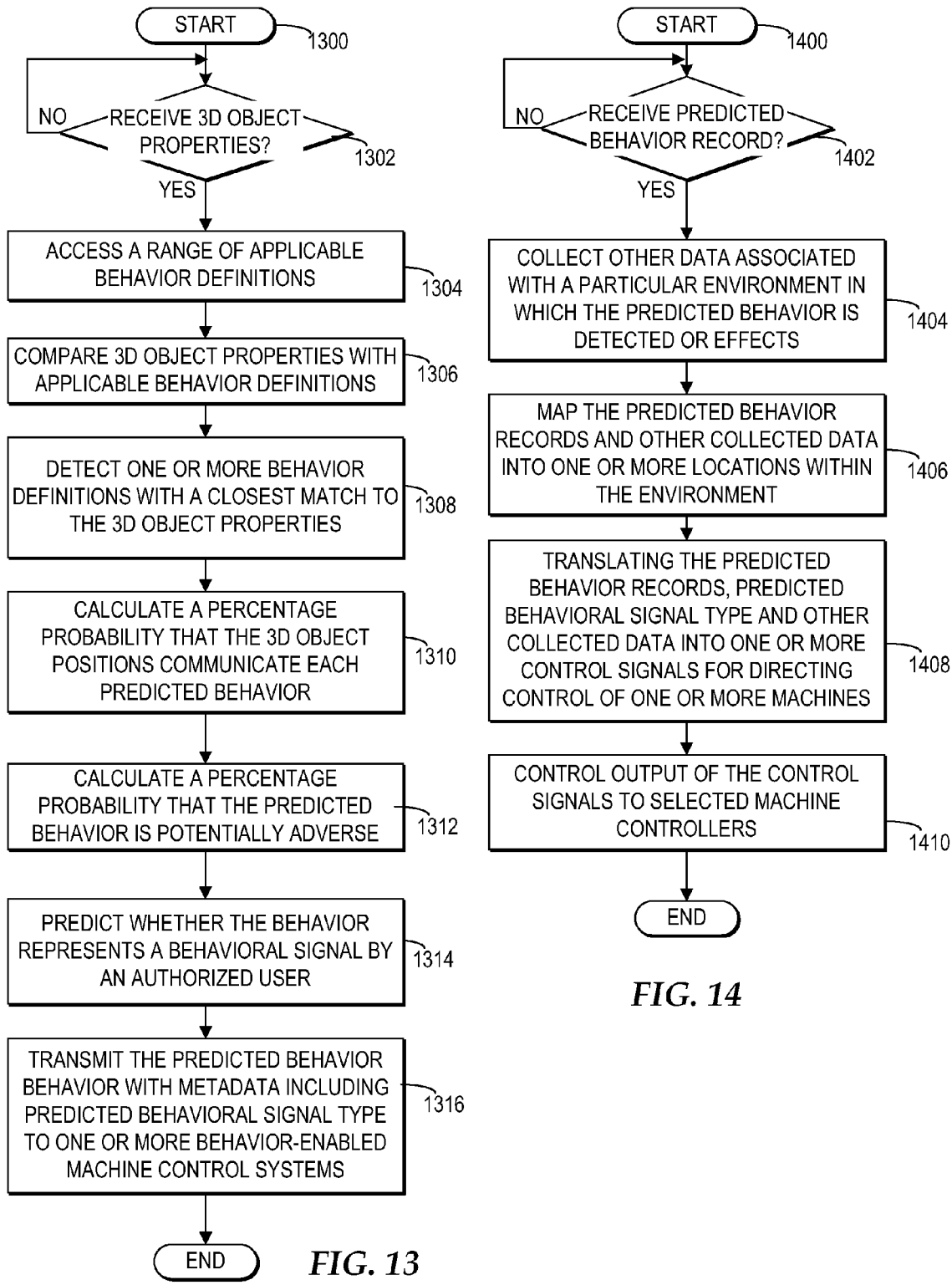
FIG. 13 is a high level logic flowchart illustrating a process and program for behavior prediction from tracked 3D object properties.
FIG. 14 is a high level logic flowchart depicting. a process and program for applying a predicted behavior record in a behavior-enabled machine control system.

Referring now to FIG. 13, a high level logic flowchart depicts a process and program for behavior prediction from tracked 3D object properties. In the example, the process starts at block 1300 and thereafter proceeds to block 1302. Block 1302 depicts a determination whether the behavior interpreter system receives 3D object properties. When the behavior interpreter system receives 3D object properties, then the process passes to block 1304. Block 1304 depicts accessing a range of applicable behavior definitions, and the process passes to block 1306.

Block 1306 illustrates the behavior interpreter system comparing the 3D object properties for tracked objects with the applicable behavior definitions. Next, block 1308 depicts the behavior interpreter system detecting at least one behavior definition with a closest match to one or more sets of 3D object properties. Thereafter, block 1310 illustrates calculating a percentage probability that the 3D object properties match the behavior definitions. Next, block 1312 depicts predicting whether the behavior represents a behavioral signal by an authorized user. Thereafter, block 1314 illustrates generating at least one predicted behavior record with any predicted behavior, percentage probability that the predicted behavior is correct, predicted type of behavioral signal, and other sensed data. Next, block 1316 depicts transmitting the predicted behavior records to a particular behavior-enabled machine control system, and the process ends.

With reference now to FIG. 14, a high level logic flowchart depicts a process and program for applying a predicted behavior record in a behavior-enabled machine control system. As illustrated, the process starts at block 1400 and thereafter proceeds to block 1402. Block 1402 depicts a determination whether a behavior-enabled machine control system receives a predicted behavior record. When the machine control system receives a predicted behavior record, then the process passes to block 1404. Block 1404 illustrates collecting other data associated with a particular environment, including, but not limited to, other predicted behavior records within the environment, and other data accessible to the machine control system. Thereafter, block 1406 depicts mapping the predicted behaviors and other collected data into one or more locations within the environment. Next, block 1408 illustrates translating the predicted behavior records and other collected data into one or more machine control signals for directing control of one or more machines. Thereafter, block 1410 illustrates controlling output of the signals to the selected machine controllers, and the process ends.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for generating control signals for a machine based on user behavior, comprising:
   capturing a three-dimensional movement of a user, wherein the three-dimensional movement is determined using at least one image capture device aimed at the user;
   identifying a three-dimensional object properties stream using the captured movement;
   identifying a location of the user within a background environment from among a plurality of background environments when the captured movement is captured;
   identifying a particular defined behavior of the user representing a particular behavioral signal from the three-dimensional object properties stream and selecting at least one machine from among a plurality of machines by comparing the identified three-dimensional object properties stream with a plurality of behavior definitions specified for the identified location of the user within the background environment and each representing a separate behavioral signal for directing control of the at least one machine from among the plurality of machines; and
   in response to identifying the particular defined behavior of the user representing the particular behavioral signal from among the plurality of behavior definitions specified for the location of the user within the background environment, generating a control signal triggered by the particular behavioral signal for directing control of the at least one selected machine.

2. The method according to claim 1, wherein capturing a three-dimensional movement of the user further comprises capturing the three-dimensional movement using a stereoscopic image device to identify and track a particular three-dimensional movement of the user.

3. The method according to claim 1, wherein capturing a three-dimensional movement of the user further comprises capturing at least one image frame of a user at a first point in time and comparing at least one additional image frame from a second point in time with the image frame from the first point in time.

4. The method according to claim 1, wherein identifying a particular defined behavior representing a particular behavioral signal from the three-dimensional object properties stream further comprises calculating a percentage probability that the captured three-dimensional movement represents a particular behavior and represents the behavioral signal defined in the particular behavior definition.

5. The method according to claim 1, wherein identifying a particular defined behavior representing a particular behavioral signal from the three-dimensional object properties stream further comprises identifying at least one body movement of the user comprising a fine granularity movement of at least one of a facial expression, an eye movement, a muscle contraction, and change in skin surface characteristics of the user within the three-dimensional object properties stream matching at least one of the plurality of behavior definitions.

6. The method according to claim 1, wherein identifying a particular defined behavior representing a particular behavioral signal from the three-dimensional object properties stream further comprises identifying at least one behavior by the user signaling the user is experiencing a medical emergency, wherein the particular behavioral signal of a medical emergency directs control of the at least one machine for automatically generating a notification to a medical dispatch controller.

7. The method according to claim 1, wherein identifying a particular defined behavior of the user representing a particular behavioral signal from the three-dimensional object properties stream and selecting at least one machine from among a plurality of machines by comparing the identified three-dimensional object properties stream with a plurality of behavior definitions specified for the location of the user within the background environment and each representing a separate behavioral signal for directing control of the at least one machine from among the plurality of machines further comprises:
 detecting a current process of the at least one machine from at least one process performed by the at least one machine; and
 identifying the particular defined behavior of the user representing a particular behavioral signal from the three-dimensional object properties stream by comparing the identified three-dimensional object properties stream with the plurality of behavior definitions specified for the current process.

8. The method according to claim 1, wherein generating a control signal triggered by the particular behavioral signal for directing control of at least one machine further comprises:
 sending the particular defined behavior to a machine control system for generating the control signal; and
 translating, at the machine control system, the particular defined behavior representing the particular behavioral signal into at least one control signal for directing control of the at least one machine from among a plurality of machines controllable by the machine control system.

9. A system for generating control signals for a machine based on user behavior, comprising:
 a behavior processing system communicative connected to a network, further comprising:
  means for capturing a three-dimensional movement of a user, wherein the three-dimensional movement is determined using at least one image capture device aimed at the user;
  means for identifying a three-dimensional object properties stream using the captured movement;
  means for identifying a location of the user within a background environment from among a plurality of background environments when the captured movement is captured; and
  means for identifying a particular defined behavior of the user representing a particular behavioral signal from the three-dimensional object properties stream and selecting at least one machine from among a plurality of machines by comparing the identified three-dimensional object properties stream with a plurality of behavior definitions specified for the identified location of the user within the background environment and each representing a separate behavioral signal for directing control of the at least one machine from among the plurality of machines;
 a machine control system communicatively connected to the behavior processing system via the network for generating a control signal triggered by the particular behavioral signal for directing control of the at least one selected machine.

10. The system according to claim 9, wherein the means for capturing a three-dimensional movement of the user further comprises means for capturing the three-dimensional movement using a stereoscopic image device to identify and track a particular three-dimensional movement of the user.

11. The system according to claim 9, wherein the means for identifying a particular defined behavior representing a particular behavioral signal from the three-dimensional object properties stream further comprises means for calculating a percentage probability that the captured three-dimensional movement represents a particular behavior and represents the behavioral signal defined in the particular behavior definition.

12. The system according to claim 9, wherein the means for identifying a particular defined behavior representing a particular behavioral signal from the three-dimensional object properties stream further comprises means for identifying at least one body movement of the user comprising a fine granularity movement of at least one of a facial expression, an eye movement, a muscle contraction, and change in skin surface characteristics of the user within the three-dimensional object properties stream matching at least one of the plurality of behavior definitions.

13. The system according to claim 9, wherein the means for identifying a particular defined behavior representing a particular behavioral signal from the three-dimensional object properties stream further comprises means for identifying at least one behavior by the user signaling the user is experiencing a medical emergency, wherein the particular behavioral signal of a medical emergency directs control of the at least one machine for automatically generating a notification to a medical dispatch controller.

14. The system according to claim 9, wherein the means for identifying a particular defined behavior of the user representing a particular behavioral signal from the three-dimensional object properties stream and selecting at least one machine from among a plurality of machines by comparing the identified three-dimensional object properties stream with a plurality of behavior definitions specified for the location of the user within the background environment and each representing a separate behavioral signal for directing control of the at least one machine from among the plurality of machines further comprises:
 means for detecting a current process of the at least one machine from at least one process performed by the at least one machine; and
 means for identifying the particular defined behavior of the user representing a particular behavioral signal from the three-dimensional object properties stream by comparing the identified three-dimensional object properties stream with the plurality of behavior definitions specified for the current process.

15. The system according to claim 9, wherein the machine control system for generating a control signal triggered by the particular behavioral signal for directing control of at least one machine further comprises:
 means for translating the particular defined behavior representing the particular behavioral signal into at least one control signal for directing control of the at least one machine from among a plurality of machines controllable by the machine control system.

16. A program product comprising a non-transitory storage-type computer-readable medium including a computer-readable program for generating control signals for a machine based on user behavior, wherein the computer-readable program when executed on a computer cause the computer to:

capture a three-dimensional movement of a user, wherein the three-dimensional movement is determined using at least one image capture device aimed at the user;

identify a three-dimensional object properties stream using the captured movement;

identify a location of the user within a background environment from among a plurality of background environments when the captured movement is captured;

identify a particular defined behavior of the user representing a particular behavioral signal from the three-dimensional object properties stream and selecting at least one machine from among a plurality of machines by comparing the identified three-dimensional object properties stream with a plurality of behavior definitions specified for the identified location of the user within the background environment and each representing a separate behavioral signal for directing control of the at least one machine from among the plurality of machines; and in response to identifying the particular defined behavior of the user representing the particular behavioral signal from among the plurality of behavior definitions specified for the location of the user within the background environment, generate a control signal triggered by the particular behavioral signal or directing control of of the at least one selected machine.

17. The program product of claim 16, wherein the computer-readable program when executed on the computer further causes the computer to capture the three-dimensional movement using a stereoscopic image device to identify and track a particular three-dimensional movement of the user.

18. The program product of claim 16, wherein the computer-readable program when executed on the computer further causes the computer to calculate a percentage probability that the captured three-dimensional movement represents a particular behavior and represents the behavioral signal defined in the particular behavior definition.

19. The program product of claim 16, wherein the computer-readable program when executed on the computer further causes the computer to identify at least one behavior by the user signaling the user is experiencing a medical emergency, wherein the particular behavioral signal of a medical emergency directs control of the at least one machine for automatically generating a notification to a medical dispatch controller.

* * * * *